(12) United States Patent
Ho et al.

(10) Patent No.: US 9,185,666 B2
(45) Date of Patent: Nov. 10, 2015

(54) POWER HEADROOM REPORTING RELATED TO POWER MANAGEMENT MAXIMUM POWER REDUCTION

(75) Inventors: Sai Yiu Duncan Ho, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 13/455,014

(22) Filed: Apr. 24, 2012

(65) Prior Publication Data

US 2012/0281568 A1 Nov. 8, 2012

Related U.S. Application Data

(60) Provisional application No. 61/483,562, filed on May 6, 2011.

(51) Int. Cl.
   *H04W 52/36* (2009.01)
(52) U.S. Cl.
   CPC .............. *H04W 52/365* (2013.01); *Y02B 60/50* (2013.01)
(58) Field of Classification Search
   USPC ......... 370/252, 328, 329, 311, 338, 436, 501; 455/522
   See application file for complete search history.

(56) References Cited

U.S. PATENT DOCUMENTS

| | | | |
|---|---|---|---|
| 8,811,322 B2 * | 8/2014 | Feuersanger et al. | 370/329 |
| 2010/0296470 A1 * | 11/2010 | Heo et al. | 370/329 |
| 2010/0297993 A1 * | 11/2010 | Heo et al. | 455/423 |
| 2011/0080838 A1 | 4/2011 | Larsson et al. | |
| 2011/0092217 A1 * | 4/2011 | Kim et al. | 455/450 |
| 2011/0105173 A1 | 5/2011 | Haim et al. | |
| 2011/0136484 A1 * | 6/2011 | Braun et al. | 455/422.1 |

(Continued)

FOREIGN PATENT DOCUMENTS

| | | |
|---|---|---|
| JP | 2014506097 A | 3/2014 |
| WO | 2011039214 A2 | 4/2011 |

(Continued)

OTHER PUBLICATIONS

3GPP, ETSI TS 136 101: LTE; Evolved Universal Terrestrial Radio Access (E-UTRA); User Equipment (UE) radio transmission and reception (3GPP TS 36.101 version 10.2.1 Release 10), Apr. 27, 2011, 3GPP, V10.2.1.*

(Continued)

*Primary Examiner* — Benjamin H Elliott, IV
*Assistant Examiner* — Eric Nowlin
(74) *Attorney, Agent, or Firm* — Arent Fox LLP

(57) ABSTRACT

A method, an apparatus, and a computer program product for wireless communication are provided in which a difference between a previous power management maximum power reduction (P-MPR) and a current P-MPR is determined. The previous P-MPR is the P-MPR when an indication is communicated that a power backoff is applied due to the previous P-MPR. A power headroom report (PHR) is triggered when the difference is greater than a threshold and the current P-MPR is greater than a sum of a maximum power reduction (MPR) and an additional MPR (A-MPR). Moreover, an apparatus is provided in which whether and how a P-MPR has changed is indicated in a PHR, and the PHR is transmitted. An apparatus is also provided in which a request is received from an evolved Node B (eNodeB) to report a P-MPR, and a PHR is transmitted including information related to the P-MPR.

47 Claims, 14 Drawing Sheets

(56) References Cited

U.S. PATENT DOCUMENTS

| | | | |
|---|---|---|---|
| 2011/0159912 A1* | 6/2011 | Zong | 455/522 |
| 2011/0164514 A1* | 7/2011 | Afkhamie et al. | 370/252 |
| 2011/0243016 A1 | 10/2011 | Zhang et al. | |
| 2012/0008563 A1 | 1/2012 | Johansson et al. | |
| 2012/0178494 A1* | 7/2012 | Haim et al. | 455/522 |
| 2012/0207112 A1* | 8/2012 | Kim et al. | 370/329 |
| 2013/0316758 A1* | 11/2013 | Uchino et al. | 455/522 |

FOREIGN PATENT DOCUMENTS

| | | |
|---|---|---|
| WO | 2011041666 A2 | 4/2011 |
| WO | WO 2011050921 A1 * | 5/2011 |
| WO | 2012115421 A2 | 8/2012 |

OTHER PUBLICATIONS

3GPP, ETSI TS 136 321: LTE; Evolved Universal Terrestrial Radio Access (E-UTRA); Medium Access Control (MAC) protocol specification (3GPP TS 36.321 version 10.1.0 Release 10), Apr. 2011, 3GPP, v.10.1.0.*
3GPP, 3GPP TSG-RAN2 Meeting #74: R2-113270, Apr. 15, 2011, 3GPP.*
Samsung, PHR Trigger for P-MPR Change, 3GPP, 3GPP TSG-RAN2#73bis meeting, Tdoc R2-111891, Shanghai, China, Apr. 11-15, 2011.*
Samsung, P bit setting for REL-8 format, 3GPP, 3GPP TSG-RAN2#73bis meeting, Tdoc R2-111893, Shanghai, China, Apr. 11-15, 2011.*
Samsung, 3GPP TSG-RAN2#73bis meeting Tdoc R2-111891: PHR Trigger for P-MPR Change, Apr. 15, 2011, 3GPP.*
Samsung, 3GPP TSG-RAN2#73bis Tdoc R2-111893: P bit setting for REL-8 format, Apr. 15, 2011, 3GPP.*
Samsung, 3GPP TSG-RAN2 Meeting # 74 TDoc R2-113270: Clarification on PHR Trigger for Power Reduction Due to Power Management, Apr. 15, 2011, 3GPP.*
Mediatek: "Discussion on Pcmax,c and Pcmax for Rel-10", 3GPP Draft; R4-112987, 3rd Generation Partnership Project (3GPP), Mobile Competence Centre; 650, Route Des Lucioles; F-06921 Sophia-Antipolis Cedex; France, vol. RAN WG4, no. Barcelona, Spain; 20110509, May 4, 2011, XP050502753, [retreived on May 4, 2011].
Partial International Search Report—PCT/US2012/036620—ISA/EPO—Jul. 24, 2012.
Qualcomm Incorporated: "Clarifications on P-MPR PHR", 3GPP Draft; R2-113168, 3rd Generation Partnership Project (3GPP), Mobile Competence Centre; 650, Route Des Lucioles; F-06921 Sophia-Antipolis Cedex; France, vol. RAN WG2, No. Barcelona, Spain; 20110509, May 3, 2011, XP050495348, [retreived on May 3, 2011].
Samsung: "Issues on PHR trigger based on power management", 3GPP Draft; R2-113269 PMPR PHR, 3rd Generation Partnership Project (3GPP), Mobile Competence Centre; 650, Route Des Lucioles; F-06921 Sophia-Antipolis Cedex; France, vol. RAN WG2, No. Barcelona, Spain; 20110509, May 3, 2011, XP050495416, [retreived on May 3, 2011].
International Search Report and Written Opinion—PCT/US2012/036620—ISA/EPO—Sep. 10, 2012.
International Preliminary Report on Patentability—PCT/US2012/036620, The International Bureau of WIPO—Geneva, Switzerland, Nov. 21, 2013.
Translation of Office Action for Japanese Patent Application No. 2014-510380 dated Nov. 4, 2014.
3GPP TS 36.331 V10.1.0 (Mar. 2011) 3rd Generation Partnership Project; Technical Specification Group Radio Access Network; Evolved Universal Terrestrial Radio Access (E-UTRA); Radio Resource Control (RRC); Protocol specification (Release 10), 290 pages.
Interdigital Communications: "Power Management PHR Triggering Clarification and Correction", 3GPP Draft; R2-113207, Power Management Triggering. 3rd Generation Partnership Project (3GPP), Mobile Competence Centre ;650, Route Des Lucioles ; F-06921Sophia-Antipolis Cedex ; France, vol. RAN WG2, No. Barcelona, Spain;20110509, May 3, 2011,XP050495376,[retreived on May 3, 2011]the whole document.
Notice to File a Response for Korean Application No. 10-2013-7032366 dated Feb. 3, 2015, 6 pages.
Examiner's Report dated May 4, 2015 in Canadian patent Application No. 2834561, 3 pages.

* cited by examiner

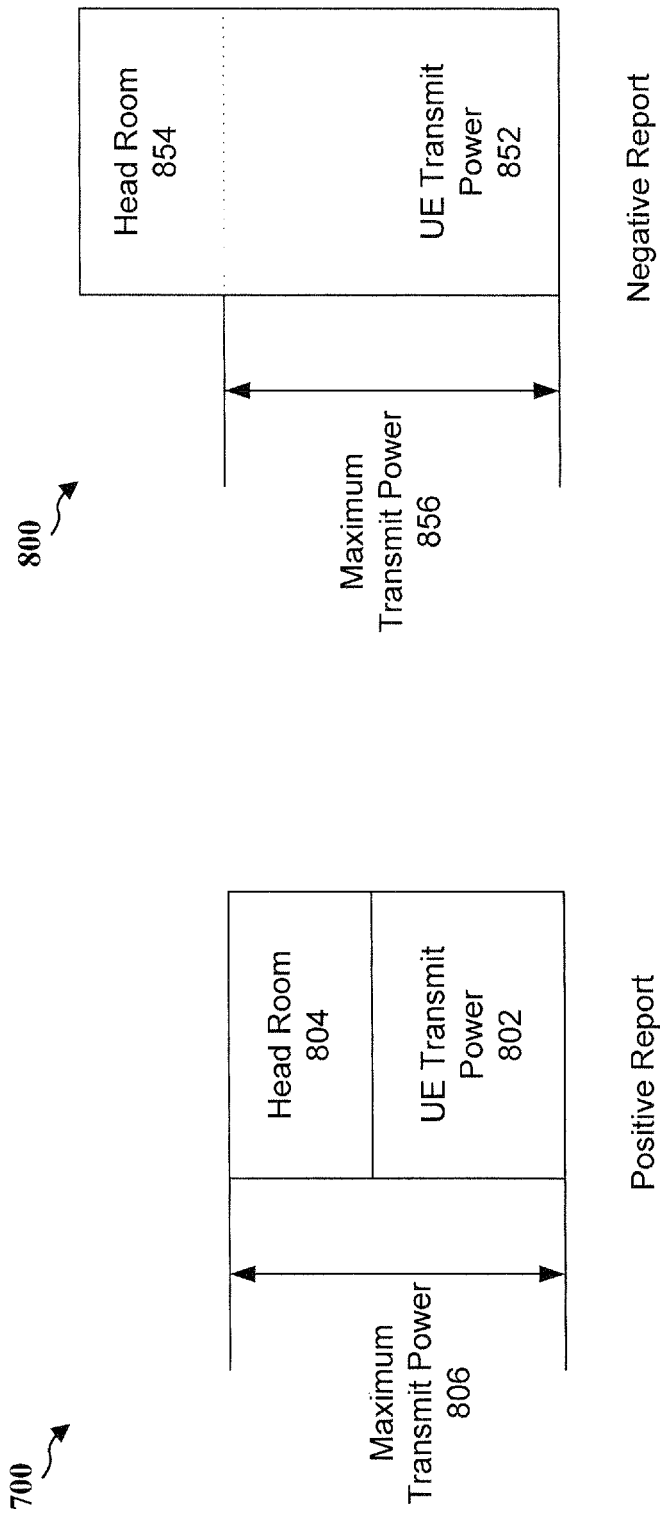

POWER HEADROOM REPORTING RELATED TO POWER MANAGEMENT MAXIMUM POWER REDUCTION

CROSS-REFERENCE TO RELATED APPLICATION(S)

This application claims the benefit of U.S. Provisional Application Ser. No. 61/483,562, entitled "POWER HEADROOM REPORTING RELATED TO POWER MANAGEMENT MAXIMUM POWER REDUCTION," and filed on May 6, 2011, which is expressly incorporated herein by reference in its entirety.

BACKGROUND

1. Field

Aspects of the present disclosure relate generally to wireless communication systems, and more particularly, to transmitting a power headroom report (PHR) related to a power management maximum power reduction (P-MPR).

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

Techniques for transmitting a power headroom report (PHR) related to a power management maximum power reduction (P-MPR) are described herein.

In an aspect, a method, an apparatus, and a computer program product are provided in which a difference between a previous P-MPR and a current P-MPR is determined. The previous P-MPR is the P-MPR when an indication is communicated that a power backoff is applied due to the previous P-MPR. A PHR is triggered when the difference is greater than a threshold and the current P-MPR is greater than a sum of a maximum power reduction (MPR) and an additional MPR (A-MPR).

In an aspect, a method, an apparatus, and a computer program product are provided in which whether and how a P-MPR has changed is indicated in a PHR, and the PHR is transmitted.

In an aspect, a method, an apparatus, and a computer program product are provided in which a request is received from an evolved Node B (eNB) to report a P-MPR, and a PHR is transmitted including information related to the P-MPR.

Various aspects and features of the disclosure are described in further detail below.

BRIEF DESCRIPTION OF THE DRAWINGS

FIG. 7 is a diagram illustrating a positive power headroom report.

FIG. 8 is a diagram illustrating a negative power headroom report.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
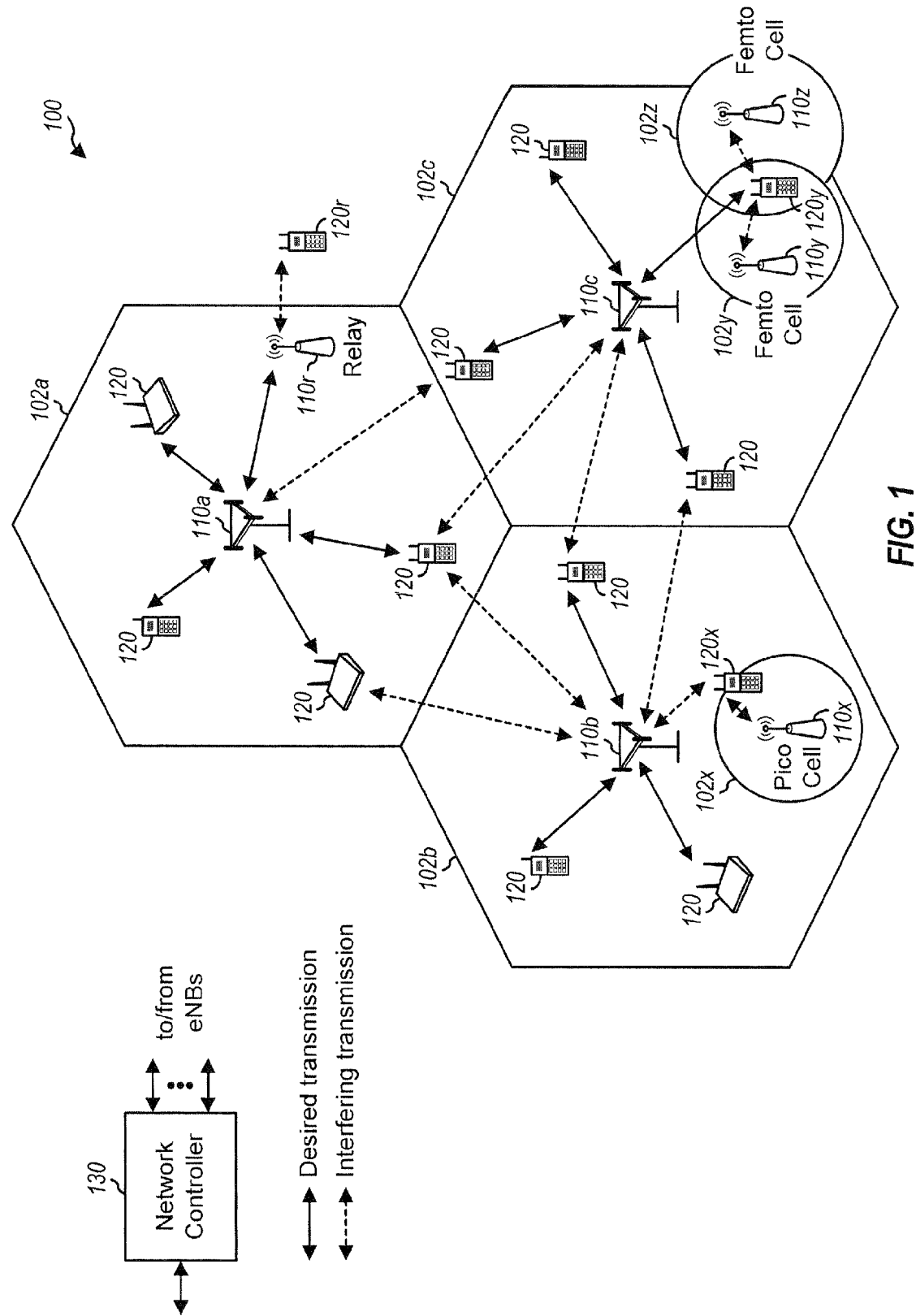
FIG. 1 is a block diagram conceptually illustrating an example of a telecommunications system.

FIG. 1 shows a wireless communication network 100, which may be an LTE network.

The wireless network 100 may include a number of evolved Node Bs (eNodeBs or eNBs) 110 and other network entities. An eNodeB may be a station that communicates with the UEs and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wired backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
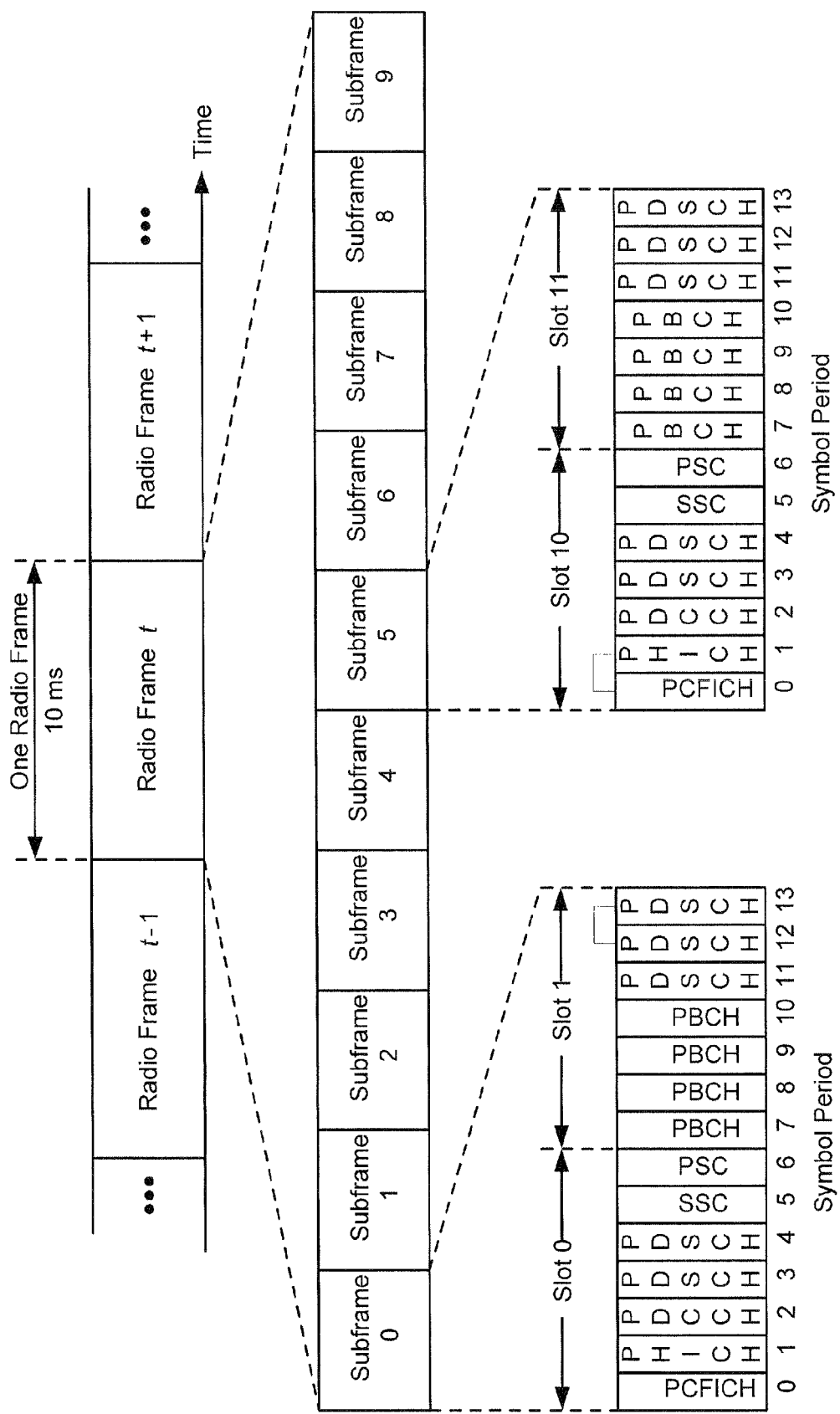
FIG. 2 is a block diagram conceptually illustrating an example of a down link frame structure in a telecommunications system.

FIG. 2 shows a downlink frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PRICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown in FIG. 2. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PRICE across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
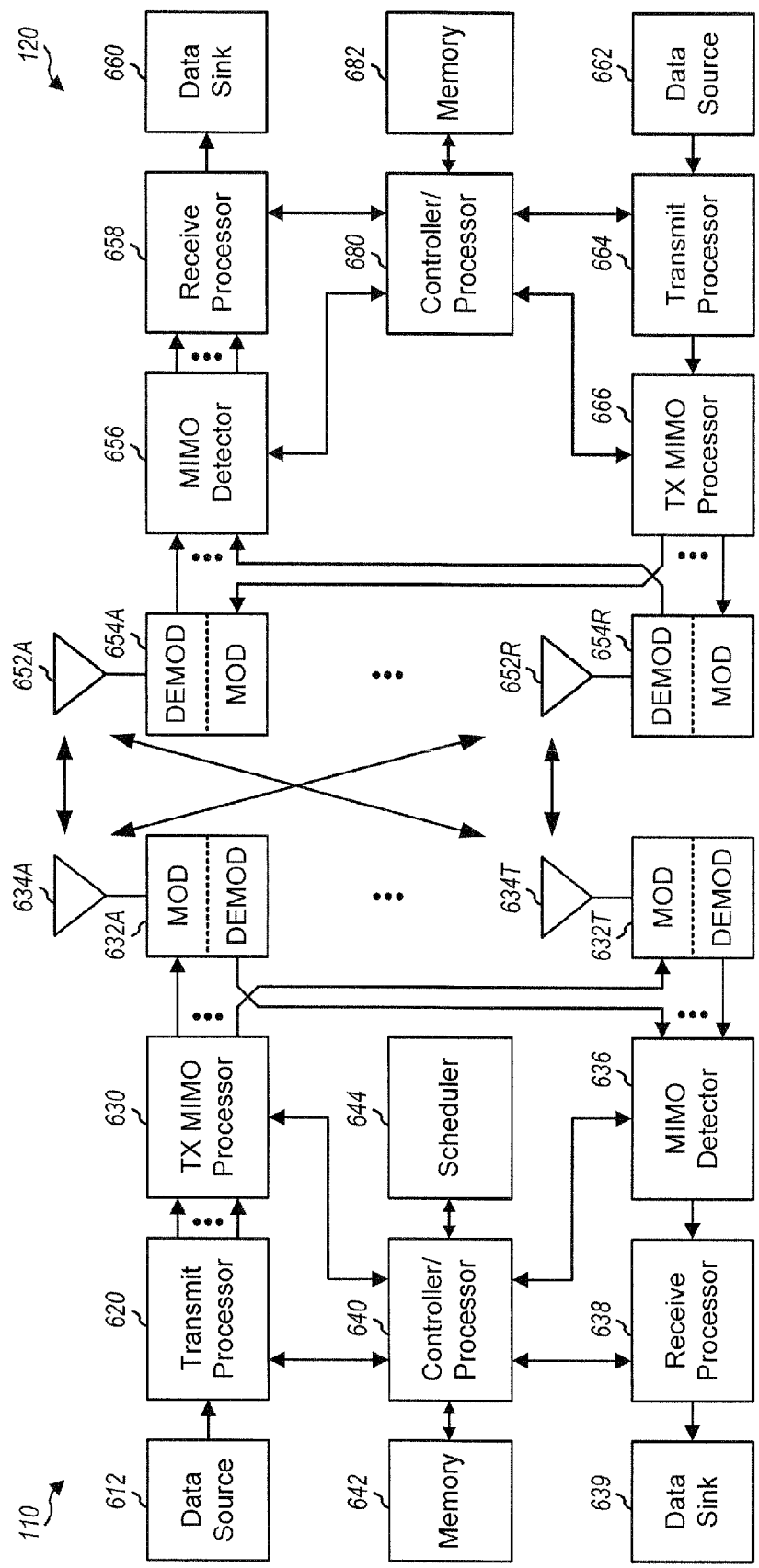
FIG. 3 is a block diagram conceptually illustrating is a block diagram conceptually illustrating a design of a base station/eNodeB and a UE configured according to one aspect of the present disclosure.

FIG. 3 shows a block diagram of a design of a base station/eNodeB 110 and a UE 120, which may be one of the base stations/eNodeBs and one of the UEs in FIG. 1. For a restricted association scenario, the base station 110 may be the macro eNodeB 110c in FIG. 1, and the UE 120 may be the UE 120y. The base station 110 may also be a base station of some other type. The base station 110 may be equipped with antennas 634a through 634t, and the UE 120 may be equipped with antennas 652a through 652r.

At the base station 110, a transmit processor 620 may receive data from a data source 612 and control information from a controller/processor 640. The control information may be for the PBCH, PCFICH, PHITCH, PDCCH, etc. The data may be for the PDSCH, etc. The processor 620 may process (e.g., encode and symbol map) the data and control information to obtain data symbols and control symbols, respectively. The processor 620 may also generate reference symbols, e.g., for the PSS, SSS, and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 632a through 632t. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. Downlink signals from modulators 632a through 632t may be transmitted via the antennas 634a through 634t, respectively.

At the UE 120, the antennas 652a through 652r may receive the downlink signals from the base station 110 and may provide received signals to the demodulators (DEMODs) 654a through 654r, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654a through 654r, perform MIMO detection on the received symbols if applicable, and provide detected symbols. A receive processor 658 may process (e.g., demodulate, deinterleave, and decode) the detected symbols, provide decoded data for the UE 120 to a data sink 660, and provide decoded control information to a controller/processor 680.

On the uplink, at the UE 120, a transmit processor 664 may receive and process data (e.g., for the PUSCH) from a data source 662 and control information (e.g., for the PUCCH) from the controller/processor 680. The processor 664 may also generate reference symbols for a reference signal. The symbols from the transmit processor 664 may be precoded by a TX MIMO processor 666 if applicable, further processed by the demodulators 654a through 654r (e.g., for SC-FDM, etc.), and transmitted to the base station 110. At the base station 110, the uplink signals from the UE 120 may be received by the antennas 634, processed by the modulators 632, detected by a MIMO detector 636 if applicable, and further processed by a receive processor 638 to obtain decoded data and control information sent by the UE 120. The processor 638 may provide the decoded data to a data sink 639 and the decoded control information to the controller/processor 640.

The controllers/processors 640 and 680 may direct the operation at the base station 110 and the UE 120, respectively. The processor 640 and/or other processors and modules at the base station 110 may perform or direct the execution of various processes for the techniques described herein. The processor 680 and/or other processors and modules at the UE 120 may also perform or direct the execution of the functional blocks illustrated in FIGS. 4 and 5, and/or other processes for the techniques described herein. The memories 642 and 682 may store data and program codes for the base station 110 and the UE 120, respectively. A scheduler 644 may schedule UEs for data transmission on the downlink and/or uplink.

Carrier Aggregation

Because the availability of large portions of contiguous spectrum may be rare, carrier aggregation of multiple component carriers may be utilized to achieve high-bandwidth transmission. LTE-Advanced UEs may use up to five 20 MHz component carriers (total of 100 MHz) for transmission in each direction. Generally, less traffic is transmitted on the uplink than the downlink. Therefore, the uplink spectrum allocation may be smaller than the downlink spectrum allocation. For example, if a 20 MHz spectrum is assigned to the uplink, the downlink may be assigned a 100 MHz spectrum. These asymmetric frequency division duplex (FDD) assignments conserve spectrum and are a good fit for broadband subscribers utilizing bandwidth asymmetrically.

Carrier Aggregation Types

Figure 4A:
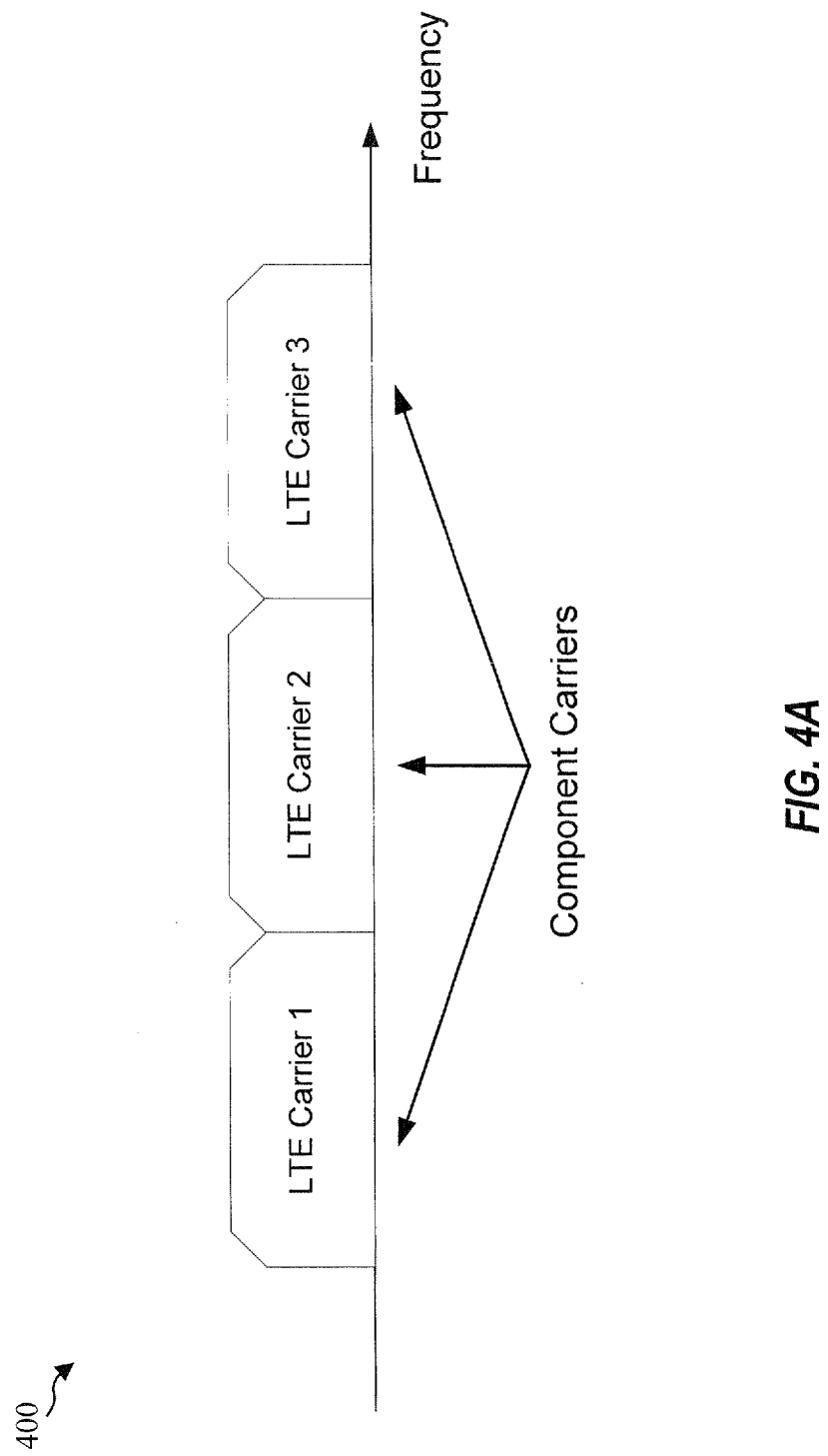
FIG. 4A is a diagram illustrating a continuous carrier aggregation type.
Figure 4B:
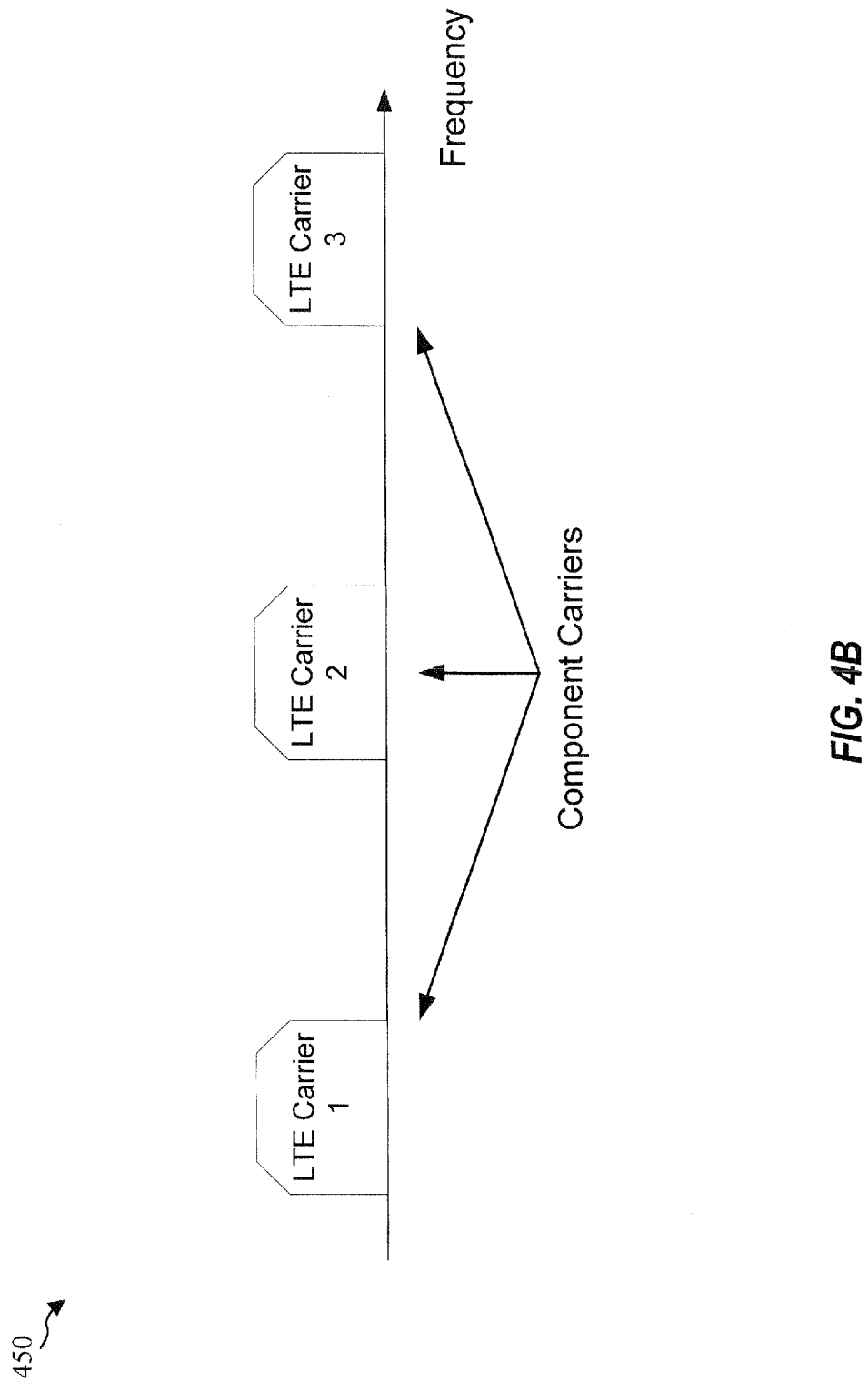
FIG. 4B is a diagram illustrating a non-continuous carrier aggregation type.

FIG. 4A is a diagram 400 illustrating continuous carrier aggregation (CA) for an LTE-Advanced mobile system. FIG. 4B is a diagram 450 illustrating non-continuous CA for an LTE-Advanced mobile system. As shown in FIG. 4B, non-continuous CA occurs when multiple available component carriers are separated along a frequency band. As shown in FIG. 4A, continuous CA occurs when multiple available component carriers are adjacent to each other along the frequency band. Both non-continuous and continuous CA may aggregate multiple LTE component carriers to serve a single UE.

Multiple radio frequency (RF) receiving units and multiple fast Fourier transforms (FFTs) may be deployed with non-continuous CA in an LTE-Advanced UE since the component carriers are separated along the frequency band. Because non-continuous CA supports data transmissions over multiple separated carriers across a large frequency range, propagation path loss, Doppler shift and other radio channel characteristics may vary greatly at different frequency bands.

To support broadband data transmission using non-continuous CA, methods may be used to adaptively adjust coding, modulation and transmission power for different component carriers. For example, in an LTE-Advanced system where the eNodeB has a fixed transmission power on each component carrier, the effective coverage or supportable modulation and coding of each component carrier may be different.

Data Aggregation Schemes

Figure 5:
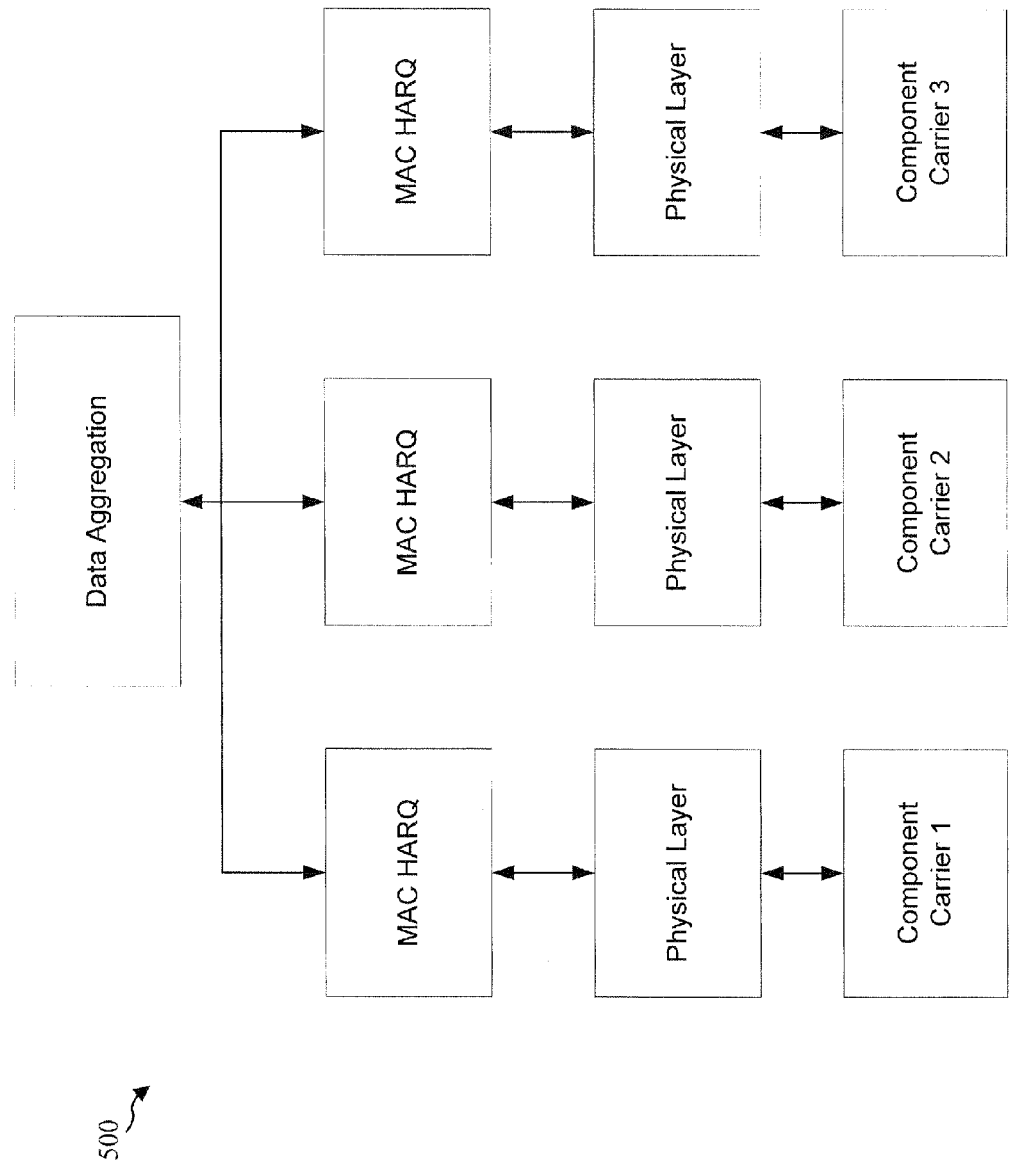
FIG. 5 is a diagram illustrating medium access control (MAC) layer data aggregation.

FIG. 5 is a diagram 500 illustrating medium access control (MAC) layer data aggregation for an IMT-Advanced system. As shown in FIG. 5, transmission blocks (TBs) are aggregated from different component carriers at the MAC layer. With MAC layer data aggregation, each component carrier has its own independent hybrid automatic repeat request (HARQ) entity in the MAC layer, and its own transmission configuration parameters (e.g., transmission power, modulation and coding schemes, and multiple antenna configuration) in the physical layer. Similarly, in the physical layer, one HARQ entity is provided for each component carrier.

Control Signaling

Control channel signaling for multiple component carriers may be deployed via three different methods. The first method involves a minor modification of the control structure in LTE systems. Particularly, each component carrier is given its own coded control channel.

The second method involves jointly coding control channels of different component carriers and deploying the control channels in a dedicated component carrier. The control information for the multiple component carriers is integrated as the signaling content in the dedicated control channel. As a result, backward compatibility with the control channel structure in LTE systems is maintained, while signaling overhead in the CA is reduced.

The third method involves jointly coding multiple control channels for different component carriers and transmitting the jointly coded multiple control channels over an entire frequency band. The third method provides low signaling overhead and high decoding performance in control channels at the expense of high power consumption at the UE.

Handover Control

Transmission continuity may be supported during a handover procedure across multiple cells when CA is used for an IMT-Advanced UE. However, reserving sufficient system resources (e.g., component carriers with good transmission quality) for an incoming UE with specific CA configurations and quality of service (QoS) requirements may be challenging for a next eNodeB because the channel conditions of two (or more) adjacent cells (eNodeBs) may be different for the specific UE. In one aspect, the UE may measure the performance of only one component carrier in each adjacent cell. This provides similar measurement delay, complexity, and energy consumption as that in LTE systems. An estimate of the performance of the other component carriers in the corresponding cell may be based on the measurement result of the one component carrier. Based on the estimate, a handover decision and transmission configuration may be determined.

According to various aspects, the UE operating in carrier aggregation (also referred to as a multicarrier system) is configured to aggregate certain functions of multiple carriers, such as control and feedback functions, on the same carrier. The same carrier may be referred to as a "primary carrier." Remaining carriers that depend on the primary carrier for support are referred to as associated "secondary carriers." For example, the UE may aggregate control functions such as those provided by an optional dedicated channel (DCH), non-scheduled grants, a physical uplink control channel (PUCCH), and/or a physical downlink control channel (PDCCH). Signaling and payload may be transmitted both on the downlink by the eNodeB to the UE, and on the uplink by the UE to the eNodeB.

In some aspects, there may be multiple primary carriers. In addition, secondary carriers may be added or removed without affecting the basic operation of the UE, including physical channel establishment and radio link failure (RLF) procedures which are layer 2 procedures, such as in the 3GPP technical specification 36.331 for the LTE RRC protocol.

Figure 6:
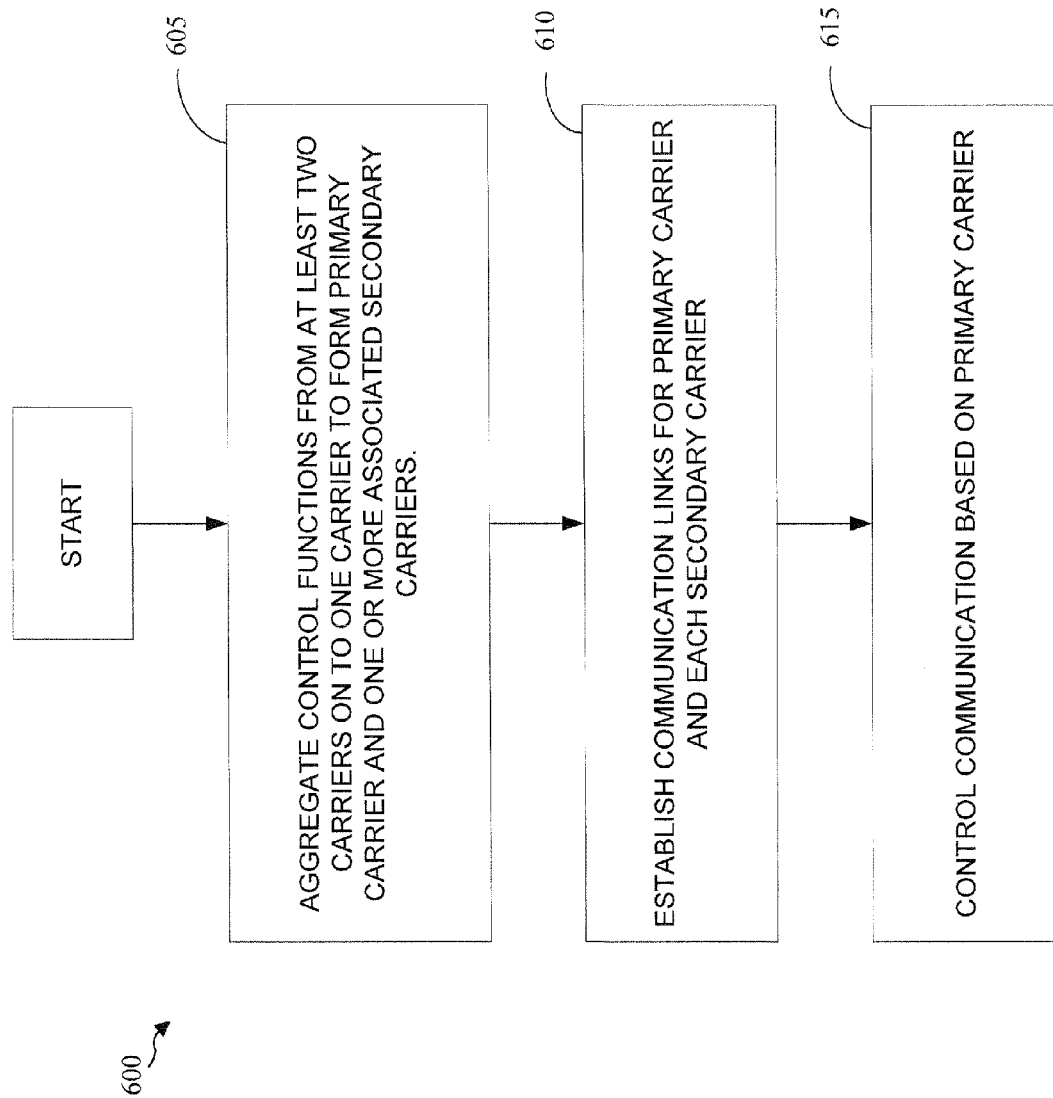
FIG. 6 is a block diagram illustrating a method for controlling radio links in multiple carrier configurations.

FIG. 6 illustrates a method 600 for controlling radio links in a multiple carrier wireless communication system by grouping physical channels according to one example. As shown in FIG. 6, the method includes, at block 605, aggregating control functions from at least two carriers onto one carrier to form a primary carrier and one or more associated secondary carriers. Next, at block 610, communication links are established for the primary carrier and each secondary carrier. Then, communication is controlled based on the primary carrier at block 615.

FIG. 7 is a diagram 700 illustrating a positive power headroom report (PHR). FIG. 8 is a diagram 800 illustrating a negative PHR. The PHR reports the headroom available at the UE. Power headroom provides an indication of how far from a rated power a power amplifier has to operate before it enters a non-linear region of operation. The PHR is transmitted from the LE to the eNodeB in order to inform the eNodeB about transmission power abilities or limitations at the UE.

Information concerning the power spectral density used at the UE is provided by the PHR. The PHR is encoded as six bits with a reporting range from +40 dB to −23 dB in 1 dB increments. A total of 64 different power headroom values are represented by the 6-bit signaling. The negative part of the reporting range is used by the UE to signal to the eNodeB the extent to which an uplink resource grant it received needs more transmission power than a current UE transmit power. In response, the eNodeB may reduce the size of a subsequent grant. As shown in FIG. 7, a positive PHR 804 indicates the difference between the maximum UE transmit power (also known as $P_{CMAX}$) 806 and a current UE transmit power 802. As shown in FIG. 8, a negative PHR 854 indicates the difference between the maximum UE transmit power 856 and a calculated UE transmit power 852. The UE transmit power may be calculated based on the UE transmitting according to the current grant with an allocated HARQ and redundancy version (RV) configuration.

Figure 9:
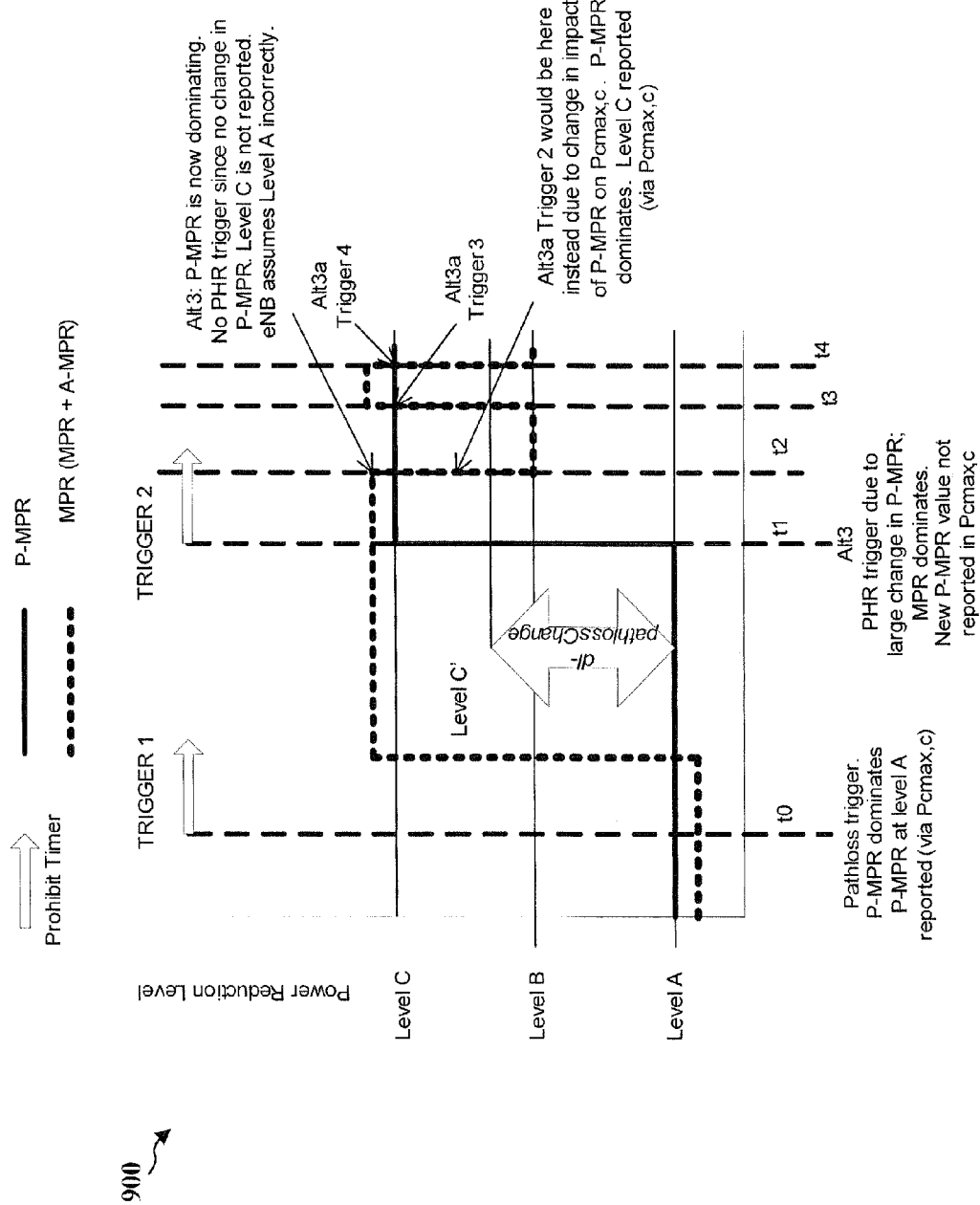
FIG. 9 is a diagram for illustrating an issue related to a potential PHR trigger as related to P-MPR and for illustrating an exemplary method.

FIG. 9 is a diagram 900 for illustrating an issue related to a potential PHR trigger as it relates to power management maximum power reduction (P-MPR), and for illustrating an exemplary method. P-MPR may be used to trigger the PHR because P-MPR affects the actual transmission headroom of the UE, and the eNodeB may not be able to perform scheduling without this information. Maximum power reduction (MPR) may be defined by an associated wireless communications protocol (e.g., 3GPP standards) to control how much a power amplifier backs off from a maximum transmission power (MTP), or used to adjust the MTP, in order to establish a modified MTP which is used during transmission of a corresponding waveform.

The difference between P-MPR and MPR is that P-MPR is a function of transmission power on another radio technology, which the eNodeB is not aware of, while MPR is a value the eNodeB has estimated. The term "MPR" may be used infra to mean the sum of MPR and A-MPR (e.g., MPR+A-MPR) without loss of generality, wherein A-MPR is an additional MPR. The larger of the P-MPR and the MPR affects a $P_{CMAX\_L}$, which is a lower bound of $P_{CMAX}$.

A PHR may be triggered based on expiry of a periodic PHR timer (i.e., periodiePHR-Timer), expiry of a prohibit PHR timer (i.e., prohibitPHR-Timer) and satisfaction of certain conditions, and satisfaction of other conditions. For example, the PHR may be triggered when a timer (e.g., prohibit timer) expires and a change in path loss has exceeded a threshold since the UE last transmitted a PHR. In another example, the PHR may be triggered when a timer (e.g., periodic timer) expires after a defined period of time.

Referring to FIG. 9, at t0, a PHR is triggered (TRIGGER 1) while P-MPR is at level A and is greater than MPR. Because a corresponding current maximum output power ($P_{CMAX,c}$) of the UE is affected by P-MPR, and because P-MPR is greater than MPR, a P bit in an extended power headroom medium access control (MAC) element is equal to 1 (i.e., P=1). If P-MPR is less than MPR, then P equals 0 (i.e., P=0).

At t1, assuming a prohibit PHR timer has expired, a PHR is triggered (TRIGGER 2) due to a change in P-MPR that is greater than a downlink (DL) path loss threshold (i.e., dl-pathlossChange) (same as Alt3 in FIG. 9). However, because MPR is greater than P-MPR, the P bit equals 0 (i.e., P=0). Therefore, a serving eNodeB may not be made aware that the P-MPR has increased.

At t2, the MPR decreases significantly and P-MPR is dominant, i.e., P-MPR is greater than MPR. However, a PHR is not triggered because P-MPR has not changed between t1 and t2. As a result, the eNodeB may incorrectly assume that P-MPR is at level A and will assign an UL grant larger than the UE can support.

However, if another PHR is triggered after t2 for other reasons, the P-MPR will be reflected in the PHR, and the eNodeB's incorrect assumption will be corrected. Nonetheless, prior to another PHR being triggered after t2, the eNodeB's estimation of P-MPR is incorrect (e.g., too low). Thus, a method for triggering a PHR to address this deficiency may be provided.

In an aspect, at Alt3a of FIG. 9, a PHR is triggered when an impact of a power backoff due to non-(A)MPR (e.g., P-MPR) effects on $P_{CMAX,c}$ changes by more than a threshold. This ensures that a PHR is triggered at t2, where P=1 is reported, and therefore the eNodeB is informed that the $P_{CMAX,c}$ is reduced by the P-MPR.

However, the trigger described with respect to Alt3a may also have side effects. For example, even when P-MPR stays constant, any MPR changes around P-MPR by more than the DL path loss threshold, causes additional unnecessary triggers such as Trigger 3 at t3 and Trigger 4 at t4.

According to a an exemplary method, the PHR trigger related to P-MPR is triggered when two conditions are satisfied: 1) P-MPR is greater than MPR; and 2) the change in P-MPR is greater than a threshold when compared to the P-MPR when a last PHR having a P bit set to 1 was sent. The rationale of the first condition is to report PHR when P-MPR dominates MPR, i.e., P-MPR>MPR, currently because such condition is necessary to convey a P-MPR value to the eNodeB (via $P_{CMAX,c}$). The rational of the second condition is to compare the current P-MPR with a last P-MPR value reported to the eNB (i.e., the P-MPR reported in the last PHR with P bit set to 1) when comparing the changes in P-MPR. The above conditions ensure that the PHR is triggered at t2, but does not provide unnecessary PHR triggers when P-MPR remains constant and MPR swings widely, such as at t3 and t4.

A problem with existing PHR reporting is that the UE may only reflect MPR or P-MPR in the PHR (via $P_{CMAX,c}$ and the P bit), but not both. Also, the eNodeB may not know what triggered the PHR, and whether the $P_{CMAX,c}$ reflects the MPR or P-MPR (except for when P-MPR dominates where the P bit is set to 1). If MPR dominates, the eNodeB will not have information regarding the current P-MPR.

According to another exemplary method, a 2-bit P-MPR info field (PI field) may be used to indicate particular information, as shown in Table 1 below.

TABLE 1

PI Fields

| PI Field | Definition |
| --- | --- |
| '00' | The reported $P_{CMAX,c}$ is NOT affected by P-MPR (i.e., max(P-MPR, MPR) = MPR) and P-MPR has not increased nor decreased beyond dl-pathlossChange since the last PHR with the PI field set to '11'. |
| '01' | The reported $P_{CMAX,c}$ is NOT affected by P-MPR but P-MPR has increased beyond dl-pathlossChange since the last PHR with the PI field set to '11'. |
| '10' | The reported $P_{CMAX,c}$ is NOT affected by P-MPR but P-MPR has decreased beyond dl-pathlossChange since the last PHR with the PI field set to '11'. |
| '11' | The reported $P_{CMAX,c}$ is affected by P-MPR (i.e., max(P-MPR, MPR) = P-MPR). |

Referring to FIG. 9 and Table 1, at t0, the UE will set the PI field to '11' in the PHR. At t1, the UE will set the PI field to '01' so as to inform the eNodeB that the actual P-MPR is somewhere between level C and level C'. An unnecessary PHR will not be triggered when P-MPR stays more or less constant and MPR fluctuates around the P-MPR, such as at t3 and t4. In one configuration, when the eNodeB wishes to obtain the exact P-MPR of the UE, the eNodeB may send a P-MPR PHR request, and the UE may report its P-MPR in the PHR. The UE may report its P-MPR in a new extended power headroom MAC control element or reuse a current extended power headroom MAC control element format. The UE may also use a $P_{CMAX,c}$ field to carry the P-MPR required by the UE.

Figure 11:
FIG. 11 is a diagram illustrating an exemplary extended power headroom MAC control element.
Figure 10:
FIG. 10 is a diagram illustrating an extended power headroom edia access control (MAC) control element.

FIG. 10 is a diagram 1000 illustrating an extended power headroom medium access control (MAC) control element. FIG. 11 is a diagram 1100 illustrating an exemplary extended power headroom MAC control element. Referring to FIG. 10, the P bit in the extended power headroom MAC control element may be defined as a field indicating whether the UE applies an additional power backoff due to power management (as allowed by P-MPR). The UE may set P equal to 1 if a corresponding $P_{CMAX,c}$ would have had a different value if no additional power management had been applied.

Referring to FIG. 11, the aforementioned PI field of Table 1 may be added, and the P bit removed, in the exemplary extended power headroom MAC control element. When the P bit of FIG. 10 is set to 1, the P bit allows the eNodeB to know that the P-MPR has an effect on the $P_{CMAX,c}$ so that the eNodeB can remove a corresponding PHR sample from a UE MPR behavior learning algorithm. Essentially, the PI field of FIG. 11 having the code point '11' (see Table 1) maps to P=1 and the remaining code points map to P=0. As shown in FIG. 11, a PI field may replace a pair of reserve bits (R bits) of FIG. 10 adjacent to the $P_{CMAX,c}$ fields. Moreover, in FIG. 11, reserve bits (R bits) replace the P bits of FIG. 10.

The exemplary methods described above provide P-MPR information to a serving eNodeB. Additional methods are also possible through combinations of the exemplary methods.

Figure 12:
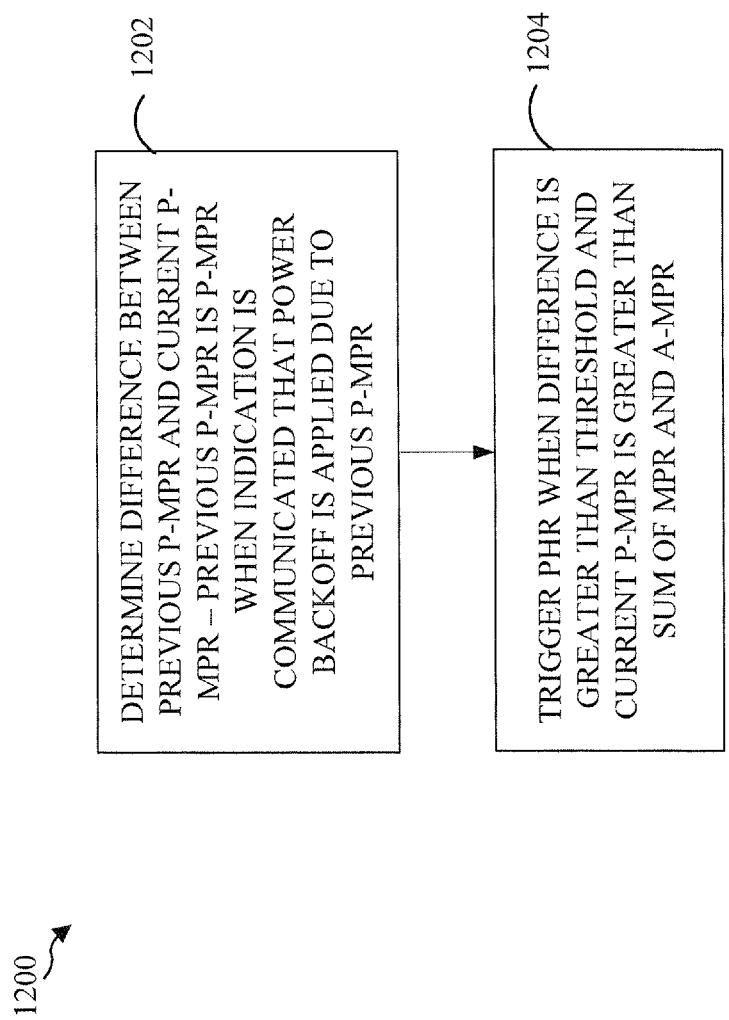
FIG. 12 is a flow chart of a method of wireless communication.

FIG. 12 is a flow chart 1200 of a method of wireless communication. The first method may be performed by a UE. At step 1202, the UE determines a difference between a previous P-MPR and a current P-MPR. The previous P-MPR may be the P-MPR when an indication is communicated that a power backoff is applied due to a previous P-MPR (1202). At step 1204, the UE may trigger a PHR when the difference is greater than a threshold and the current P-MPR is greater than a sum of an MPR and an A-MPR. In one configuration, the trigger replaces a trigger of the PHR that is based on a change of the current P-MPR and a previous P-MPR being greater than a threshold. The previous P-MPR may be the P-MPR when a last PHR was transmitted.

In one configuration, the UE may also indicate whether and how the current P-MPR has changed in the PHR. The UE may also indicate whether a reported current maximum output power $P_{CMAX,c}$ is affected by the current P-MPR in the PHR. For example, the UE may indicate whether the reported $P_{CMAX,c}$ is affected by the current P-MPR by providing an indication when the reported $P_{CMAX,c}$ is unaffected by the current P-MPR, and the current P-MPR has not increased or decreased by more than a downlink path loss change threshold (i.e., dl-pathlossChange) since a last report indicating the reported $P_{CMAX,c}$ is affected by the current P-MPR. See PI field "00" of Table 1.

In another example, the UE may indicate whether the reported $P_{CMAX,c}$ is affected by the current P-MPR by providing an indication when the reported $P_{CMAX,c}$ is unaffected by the current P-MPR, and the current P-MPR has increased by more than a downlink path loss change threshold since a last report indicating the reported $P_{CMAX,c}$ is affected by the current P-MPR. See PI field "01" of Table 1.

In a further example, the UE may indicate whether the reported $P_{CMAX,c}$ is affected by the current P-MPR by providing an indication when the reported $P_{CMAX,c}$ is unaffected by the current P-MPR, and the current P-MPR has decreased by more than a downlink path loss change threshold since a last report indicating the reported $P_{CMAX,c}$ is affected by the current P-MPR (see PI field "10" of Table 1).

In yet another example, the UE may indicate whether the reported $P_{CMAX,c}$ is affected by the current P-MPR by providing an indication when the reported $P_{CMAX,c}$ is affected by the current P-MPR. See PI field "11" of Table 1. In one configuration, the PHR includes an extended power headroom MAC control element, and the indication is included in the extended power headroom MAC control element. That is, the PI field may be within the extended power headroom MAC control element, as shown in FIG. 11.

Figure 13:
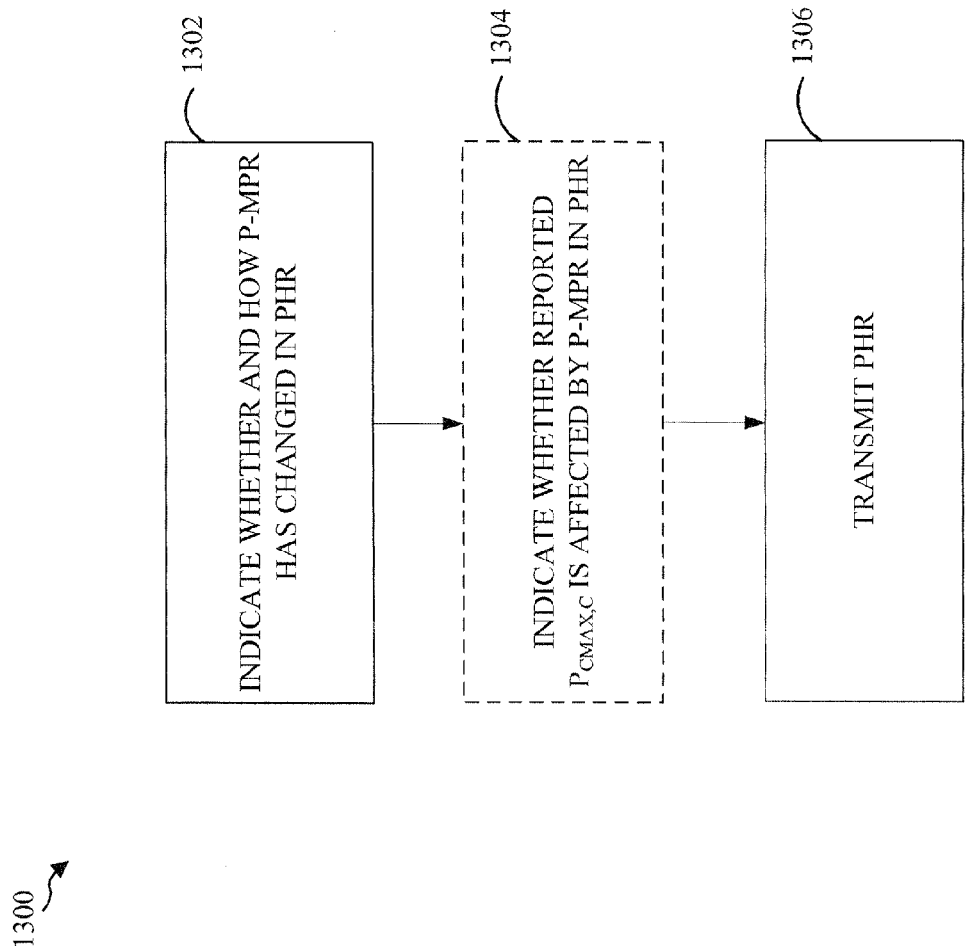
FIG. 13 is a flow chart of a method of wireless communication.

FIG. 13 is a flow chart 1300 of a method of wireless communication. The method may performed by a UE. At step 1302, the UE indicates whether a P-MPR has changed in a PHR, and how the P-MPR has changed if a change was indicated. At step 1306, the UE transmits the PHR. However, before transmitting the PHR, at step 1304, the UE may also indicate whether a reported current maximum output power $P_{CMAX,c}$ is affected by the P-MPR in the PHR.

For example, the UE may indicate whether the reported $P_{CMAX,c}$ is affected by the P-MPR by providing an indication when the reported $P_{CMAX,c}$ is unaffected by the P-MPR, and the P-MPR has not increased or decreased by more than a downlink path loss change threshold since a last report indicating the reported $P_{CMAX,c}$ is affected by the P-MPR. See PI field "00" of Table 1).

In another example, the UE may indicate whether the reported $P_{CMAX,c}$ is affected by the P-MPR by providing an indication when the reported $P_{CMAX,c}$ is unaffected by the P-MPR, and the P-MPR has increased by more than a downlink path loss change threshold since a last report indicating the reported $P_{CMAX,c}$ is affected by the P-MPR. See PI field "01" of Table 1.

In a further example, the UE may indicate whether the reported $P_{CMAX,c}$ is affected by the P-MPR by providing an indication when the reported $P_{CMAX,c}$ is unaffected by the P-MPR, and the P-MPR has decreased by more than a downlink path loss change threshold since a last report indicating the reported $P_{CMAX,c}$ is affected by the P-MPR. See PI field "10" of Table 1.

In yet another example, the UE may indicate whether the reported $P_{CMAX,c}$ is affected by the P-MPR by providing an indication when the reported $P_{CMAX,c}$ is affected by the P-MPR. See PI field "11" of Table 1. In one configuration, the PHR includes an extended power headroom MAC control element, and the indication is included in the extended power headroom MAC control element. That is, the PI field may be within the extended power headroom MAC control element, as shown in FIG. 11.

Figure 14:
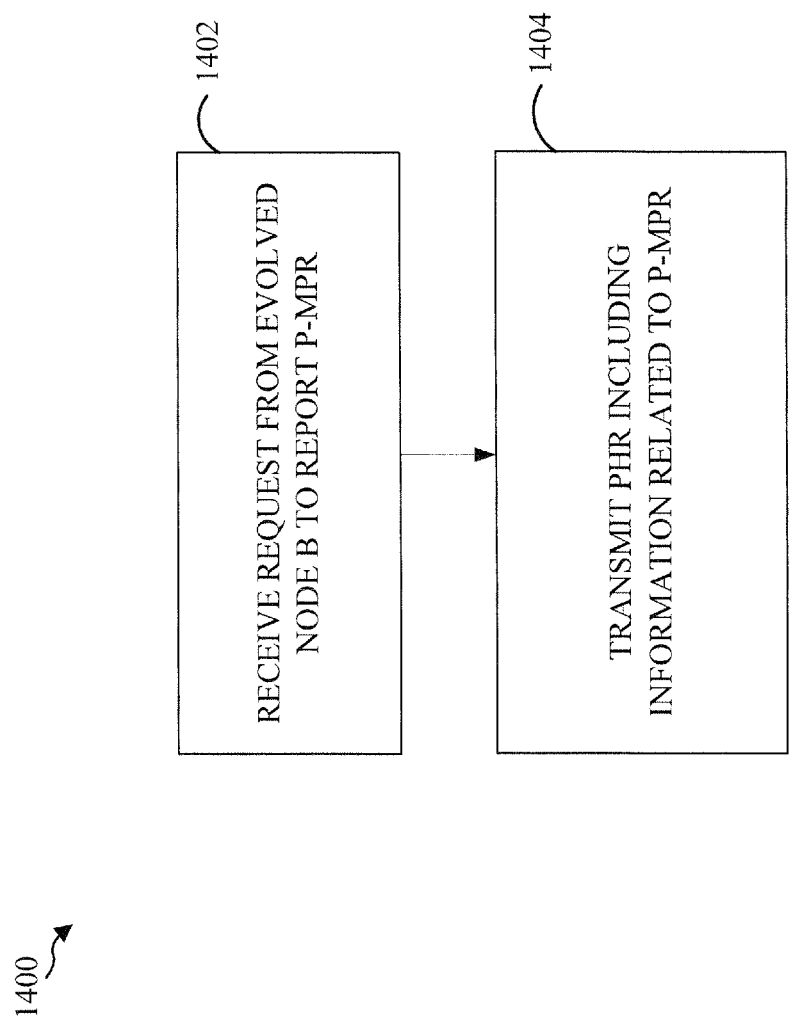
FIG. 14 is a flow chart of a method of wireless communication.

FIG. 14 is a flow chart 1400 of a method of wireless communication. The method may be performed by a UE. At step 1402, the UE receives a request from an eNodeB to report a P-MPR. Thereafter, at step 1404, the UE transmits a PHR including information related to the P-MPR requested by the eNodeB.

Figure 15:
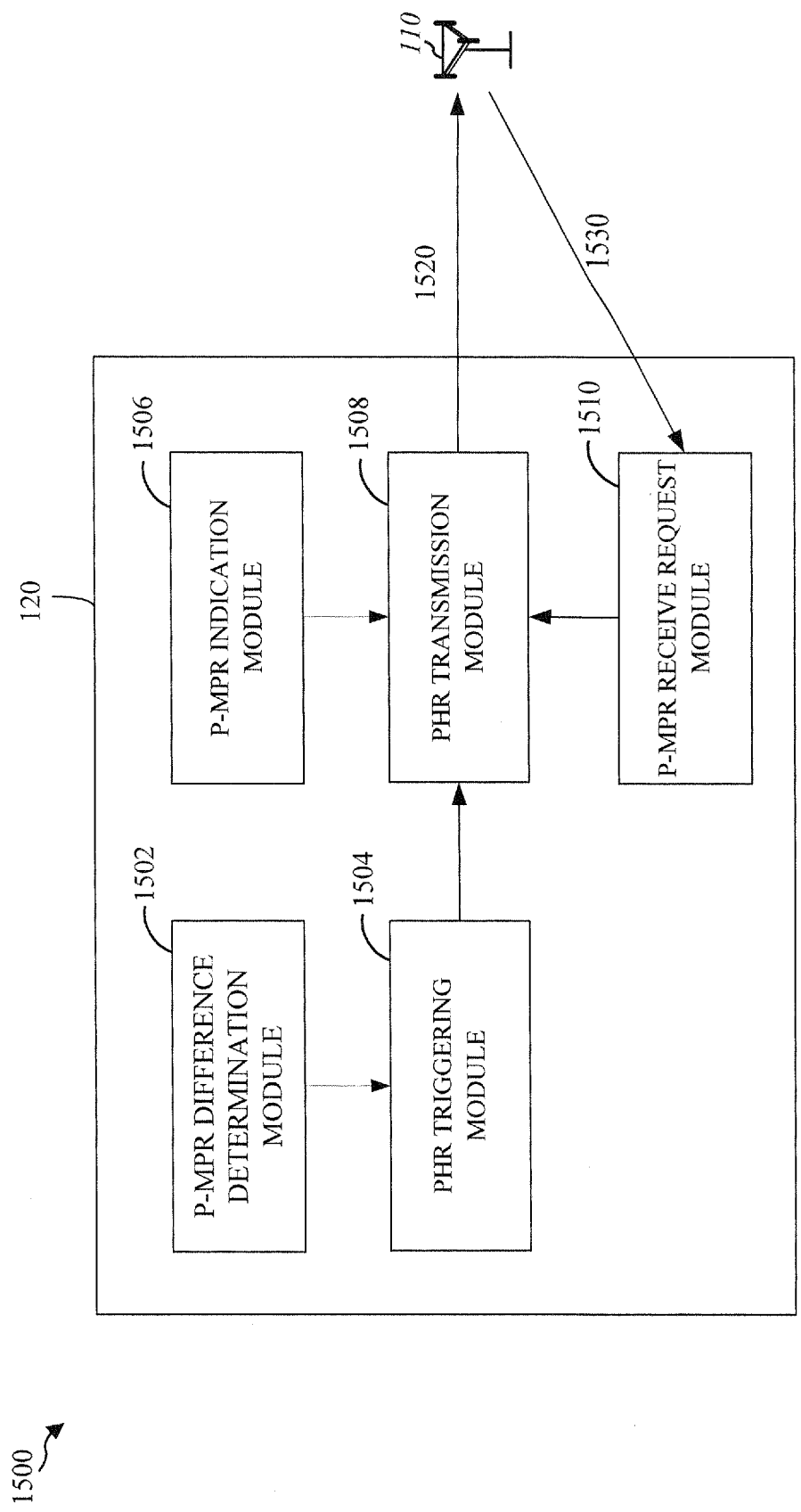
FIG. 15 is a conceptual data flow diagram illustrating the data flow between different modules/means/components in an exemplary apparatus.

FIG. 15 is a conceptual block diagram 1500 illustrating the functionality of an exemplary apparatus 120. The apparatus 120 may be a UE. As shown in FIG. 15, the apparatus 120 includes a P-MPR difference determination module 1502. The P-MPR difference determination module 1502 determines a difference between a previous P-MPR and a current P-MPR. The previous P-MPR is the P-MPR when an indication is communicated that a power backoff is applied due to the previous P-MPR. The PHR triggering module 1504 receives difference information or an indication of the difference from the P-MPR difference determination module. The PHR triggering module 1504 triggers a PHR when a prohibit-PHR-Timer expires or has expired, the difference is greater than a threshold, and the current P-MPR is greater than a sum of an MPR and an A-MPR. The apparatus 120 further includes a P-MPR indication module 1506 that indicates whether and how a P-MPR has changed in a PHR and a PHR transmission module 1508 that transmits (1520) the PHR to the eNB 110. The 120 further includes a P-MPR receive request module 1510 that receives (1530) a request from the eNB 110 to report a P-MPR. The PHR transmission module 1508 may transmits a PHR including information related to the P-MPR. While FIG. 15 shows the apparatus 120 including modules 1502-1510, an exemplary apparatus may include more or less modules. For example, a first exemplary apparatus 120 may include only modules 1502 and 1504, a second exemplary apparatus 120 may include only modules 1506 and 1508, and a third exemplary apparatus 120 may include only modules 1508 and 1510. However, additional exemplary apparatuses may include different combinations of the modules 1502-1510.

Referring again to FIG. 3 and FIG. 15, in one configuration, an apparatus includes means for determining a difference between a previous P-MPR and a current P-MPR. The previous P-MPR is the P-MPR when an indication is communicated that a power backoff is applied due to the previous P-MPR. The apparatus further includes means for triggering a PHR when the difference is greater than a threshold and the current P-MPR is greater than a sum of an MPR and an A-MPR. The apparatus may further include means for indicating whether and how the current P-MPR has changed in the PHR. The apparatus may further include means for indicating whether a reported current maximum output power $P_{CMAX,c}$ is affected by the current P-MPR in the PHR. The aforementioned means may be the controller/processor 680, the memory 682, the receive processor 658, the MIMO detector 656, the demodulators 654a, the antennas 652a or the apparatus 120 configured to perform the functions recited by the aforementioned means.

In one configuration, an apparatus includes means for indicating whether and how a P-MPR has changed in a PHR and means for transmitting the PHR. The apparatus may further include means for indicating whether a reported current maximum output power $P_{CMAX,c}$ is affected by the P-MPR in the PHR. The aforementioned means may be the controller/processor 680, the memory 682, the receive processor 658, the MIMO detector 656, the demodulators 654a, the antennas 652a or the apparatus 120 configured to perform the functions recited by the aforementioned means.

In one configuration, an apparatus includes means for receiving a request from an eNB to report a P-MPR and means for transmitting a PHR including information related to the P-MPR. The aforementioned means may be the controller/processor 680, the memory 682, the receive processor 658, the MIMO detector 656, the demodulators 654a, the antennas 652a or the apparatus 120 configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory. ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    determining, via a processor, a difference between a previous power management maximum power reduction (previous P-MPR) and a current power management maximum power reduction (current P-MPR), the previous P-MPR being a power management maximum power reduction when an indication is communicated that a power backoff is applied due to the previous P-MPR;
    triggering, via the processor, a power headroom report (PHR) when the difference is greater than a threshold and the current P-MPR is greater than a sum of a maximum power reduction (MPR) and an additional MPR (A-MPR); and
    indicating, via the processor:
        whether the current P-MPR has changed in the PHR,
        how the current P-MPR has changed in the PHR if a change was indicated, and
        whether a reported current maximum output power $P_{CMAX,c}$ is affected by the current P-MPR in the PHR by setting an indication in the PHR when the reported $P_{CMAX,c}$ is unaffected by the current P-MPR, the indication indicating that the current P-MPR has not increased or decreased by more than a downlink path loss change threshold since a last report indicating the reported $P_{CMAX,c}$ is affected by the current P-MPR.

2. The method of claim 1, wherein said triggering replaces a trigger of the PHR that is based on a change of the current P-MPR and the previous P-MPR being greater than a threshold, the previous P-MPR being a power management maximum power reduction when a last PHR was transmitted.

3. A method of wireless communication, comprising:
    determining, via a processor, a difference between a previous power management maximum power reduction (previous P-MPR) and a current power management maximum power reduction (current P-MPR), the previous P-MPR being a power management maximum power reduction when an indication is communicated that a power backoff is applied due to the previous P-MPR;
    triggering, via the processor, a power headroom report (PHR) when the difference is greater than a threshold and the current P-MPR is greater than a sum of a maximum power reduction (MPR) and an additional MPR (A-MPR); and
    indicating, via the processor:
        whether the current P-MPR has changed in the PHR,
        how the current P-MPR has changed in the PHR if a change was indicated, and
        whether a reported current maximum output power $P_{CMAX,c}$ is affected by the current P-MPR in the PHR, wherein whether the reported $P_{CMAX,c}$ is affected by the current P-MPR is indicated by setting an indication field in the PHR to a value of 01 when the reported $P_{CMAX,c}$ is unaffected by the current P-MPR, and the current P-MPR has increased by more than a downlink path loss change threshold since a last report indicating the reported $P_{CMAX,c}$ is affected by the current P-MPR.

4. A method of wireless communication, comprising:
    determining, via a processor, a difference between a previous power management maximum power reduction (previous P-MPR) and a current power management maximum power reduction (current P-MPR), the previous P-MPR being a power management maximum power reduction when an indication is communicated that a power backoff is applied due to the previous P-MPR;
    triggering, via the processor, a power headroom report (PHR) when the difference is greater than a threshold and the current P-MPR is greater than a sum of a maximum power reduction (MPR) and an additional MPR (A-MPR); and indicating, via the processor:
whether the current P-MPR has changed in the PHR,
how the current P-MPR has changed in the PHR if a change was indicated, and
whether a reported current maximum output power $P_{CMAX,c}$ is affected by the current P-MPR in the PHR, wherein whether the reported $P_{CMAX,c}$ is affected by the current P-MPR is indicated by setting an indication field in the PHR to a value of 10 when the reported $P_{CMAX,c}$ is unaffected by the current P-MPR, and the current P-MPR has decreased by more than a downlink path loss change threshold since a last report indicating the reported $P_{CMAX,c}$ is affected by the current P-MPR.

5. A method of wireless communication, comprising:
determining, via a processor, a difference between a previous power management maximum power reduction (previous P-MPR) and a current power management maximum power reduction (current P-MPR), the previous P-MPR being a power management maximum power reduction when an indication is communicated that a power backoff is applied due to the previous P-MPR;
triggering, via the processor, a power headroom report (PHR) when the difference is greater than a threshold and the current P-MPR is greater than a sum of a maximum power reduction (MPR) and an additional MPR (A-MPR); and
indicating, via the processor:
whether the current P-MPR has changed in the PHR,
how the current P-MPR has changed in the PHR if a change was indicated, and
whether a reported current maximum output power $P_{CMAX,c}$ is affected by the current P-MPR in the PHR, wherein whether the reported $P_{CMAX,c}$ is affected by the current P-MPR is indicated by setting an indication field in the PHR to a value of 11 when the reported $P_{CMAX,c}$ is affected by the current P-MPR.

6. The method of claim 1, wherein the PHR comprises an extended power headroom medium access control (MAC) control element and the indication is included in the extended power headroom MAC control element.

7. A method of wireless communication, comprising:
indicating to an evolved Node B (eNodeB) whether a power management maximum power reduction (P-MPR) has changed in a power headroom report (PHR);
indicating to the eNodeB how a power management maximum power reduction (P-MPR) has changed in a power headroom report (PHR) if a change was indicated;
indicating whether a reported current maximum output power $P_{CMAX,c}$ is affected by the P-MPR in the PHR by setting an indication in the PHR when the reported $P_{CMAX,c}$ is unaffected by the P-MPR, the indication indicating that the P-MPR has not increased or decreased by more than a downlink path loss change threshold since a last report indicating the reported $P_{CMAX,c}$ is affected by the P-MPR; and
transmitting the PHR to the eNodeB.

8. A method of wireless communication, comprising:
indicating to an evolved Node B (eNodeB) whether a power management maximum power reduction (P-MPR) has changed in a power headroom report (PHR);
indicating to the eNodeB how a power management maximum power reduction (P-MPR) has changed in a power headroom report (PHR) if a change was indicated;
indicating whether a reported current maximum output power $P_{CMAX,c}$ is affected by the P-MPR in the PHR, wherein whether the reported $P_{CMAX,c}$ is affected by the P-MPR is indicated by setting an indication field in the PHR to a value of 01 when the reported $P_{CMAX,c}$ is unaffected by the P-MPR, and the P-MPR has increased by more than a downlink path loss change threshold since a last report indicating the reported $P_{CMAX,c}$ is affected by the P-MPR; and
transmitting the PHR to the eNodeB.

9. A method of wireless communication, comprising:
indicating to an evolved Node B (eNodeB) whether a power management maximum power reduction (P-MPR) has changed in a power headroom report (PHR);
indicating to the eNodeB how a power management maximum power reduction (P-MPR) has changed in a power headroom report (PHR) if a change was indicated;
indicating whether a reported current maximum output power $P_{CMAX,c}$ is affected by the P-MPR in the PHR, wherein whether the reported $P_{CMAX,c}$ is affected by the P-MPR is indicated by setting an indication field in the PHR to a value of 10 when the reported $P_{CMAX,c}$ is unaffected by the P-MPR, and the P-MPR has decreased by more than a downlink path loss change threshold since a last report indicating the reported $P_{CMAX,c}$ is affected by the P-MPR; and
transmitting the PHR to the eNodeB.

10. A method of wireless communication, comprising:
indicating to an evolved Node B (eNodeB) whether a power management maximum power reduction (P-MPR) has changed in a power headroom report (PHR);
indicating to the eNodeB how a power management maximum power reduction (P-MPR) has changed in a power headroom report (PHR) if a change was indicated;
indicating whether a reported current maximum output power $P_{CMAX,c}$ is affected by the P-MPR in the PHR, wherein whether the reported $P_{CMAX,c}$ is affected by the P-MPR is indicated by setting an indication field in the PHR to a value of 11 when the reported $P_{CMAX,c}$ is affected by the P-MPR; and
transmitting the PHR to the eNodeB.

11. The method of claim 7, wherein the PHR comprises an extended power headroom medium access control (MAC) control element and the indication is included in the extended power headroom MAC control element.

12. A method of wireless communication, comprising:
receiving a request from an evolved Node B to report a power management maximum power reduction (P-MPR) value; and
transmitting a power headroom report (PHR) including information related to the P-MPR value,
wherein the PHR includes an indication field,
wherein the indication field is set to a value of 00 when a reported current maximum output power $P_{CMAX,c}$ is unaffected by the P-MPR value, and the P-MPR value has not increased or decreased by more than a downlink path loss change threshold since a last report indicating the reported $P_{CMAX,c}$ is affected by the P-MPR value,
wherein the indication field is set to a value of 01 when the reported $P_{CMAX,c}$ is unaffected by the P-MPR value, and the P-MPR value has increased by more than a downlink path loss change threshold since a last report indicating the reported $P_{CMAX,c}$ is affected by the P-MPR value,
wherein the indication field is set to a value of 10 when the reported $P_{CMAX,c}$ is unaffected by the P-MPR value, and the P-MPR value has decreased by more than a downlink path loss change threshold since a last report indicating the reported $P_{CMAX,c}$ is affected by the P-MPR value, and wherein the indication field is set to a value of 11 when the reported $P_{CMAX,c}$ is affected by the P-MPR value.

13. An apparatus for wireless communication, comprising:
means for determining a difference between a previous power management maximum power reduction (previous P-MPR) and a current power management maximum power reduction (P-MPR), the previous P-MPR being a power management maximum power reduction when an indication is communicated that a power back-off is applied due to the previous P-MPR;
means for triggering a power headroom report (PHR) when the difference is greater than a threshold and the current P-MPR is greater than a sum of a maximum power reduction (MPR) and an additional MPR (A-MPR);
means for indicating whether the current P-MPR has changed in the PHR;
means for indicating how the current P-MPR has changed in the PHR if a change was indicated; and
means for indicating whether a reported current maximum output power $P_{CMAX,c}$ is affected by the current P-MPR in the PHR by setting an indication in the PHR when the reported $P_{CMAX,c}$ is unaffected by the current P-MPR, the indication indicating that the current P-MPR has not increased or decreased by more than a downlink path loss change threshold since a last report indicating the reported $P_{CMAX,c}$ is affected by the current P-MPR.

14. The apparatus of claim 13, wherein the means for triggering replaces a trigger of the PHR that is based on a change of the current P-MPR and the previous P-MPR being greater than a threshold, the previous P-MPR being a power management maximum power reduction when a last PHR was transmitted.

15. An apparatus for wireless communication, comprising:
means for determining a difference between a previous power management maximum power reduction (previous P-MPR) and a current power management maximum power reduction (P-MPR), the previous P-MPR being a power management maximum power reduction when an indication is communicated that a power back-off is applied due to the previous P-MPR;
means for triggering a power headroom report (PHR) when the difference is greater than a threshold and the current P-MPR is greater than a sum of a maximum power reduction (MPR) and an additional MPR (A-MPR);
means for indicating whether the current P-MPR has changed in the PHR;
means for indicating how the current P-MPR has changed in the PHR if a change was indicated; and
means for indicating whether a reported current maximum output power $P_{CMAX,c}$ is affected by the current P-MPR in the PHR, wherein the means for indicating whether the reported $P_{CMAX,c}$ is affected by the current P-MPR sets an indication field in the PHR to a value of 01 when the reported $P_{CMAX,c}$ is unaffected by the current P-MPR, and the current P-MPR has increased by more than a downlink path loss change threshold since a last report indicating the reported $P_{CMAX,c}$ is affected by the current P-MPR.

16. An apparatus for wireless communication, comprising:
means for determining a difference between a previous power management maximum power reduction (previous P-MPR) and a current power management maximum power reduction (P-MPR), the previous P-MPR being a power management maximum power reduction when an indication is communicated that a power back-off is applied due to the previous P-MPR;
means for triggering a power headroom report (PHR) when the difference is greater than a threshold and the current P-MPR is greater than a sum of a maximum power reduction (MPR) and an additional MPR (A-MPR);
means for indicating whether the current P-MPR has changed in the PHR;
means for indicating how the current P-MPR has changed in the PHR if a change was indicated; and
means for indicating whether a reported current maximum output power $P_{CMAX,c}$ is affected by the current P-MPR in the PHR, wherein the means for indicating whether the reported $P_{CMAX,c}$ is affected by the current P-MPR sets an indication field in the PHR to a value of 10 when the reported $P_{CMAX,c}$ is unaffected by the current P-MPR, and the current P-MPR has decreased by more than a downlink path loss change threshold since a last report indicating the reported $P_{CMAX,c}$ is affected by the current P-MPR.

17. An apparatus for wireless communication, comprising:
means for determining a difference between a previous power management maximum power reduction (previous P-MPR) and a current power management maximum power reduction (P-MPR), the previous P-MPR being a power management maximum power reduction when an indication is communicated that a power back-off is applied due to the previous P-MPR;
means for triggering a power headroom report (PHR) when the difference is greater than a threshold and the current P-MPR is greater than a sum of a maximum power reduction (MPR) and an additional MPR (A-MPR);
means for indicating whether the current P-MPR has changed in the PHR;
means for indicating how the current P-MPR has changed in the PHR if a change was indicated; and
means for indicating whether a reported current maximum output power $P_{CMAX,c}$ is affected by the current P-MPR in the PHR, wherein the means for indicating whether the reported $P_{CMAX,c}$ is affected by the current P-MPR sets an indication field in the PHR to a value of 11 when the reported $P_{CMAX,c}$ is affected by the current P-MPR.

18. The apparatus of claim 13, wherein the PHR comprises an extended power headroom medium access control (MAC) control element and the indication is included in the extended power headroom MAC control element.

19. An apparatus for wireless communication, comprising:
means for indicating to an evolved Node B (eNodeB) whether a power management maximum power reduction (P-MPR) has changed in a power headroom report (PHR);
means for indicating to the eNodeB how a power management maximum power reduction (P-MPR) has changed in a power headroom report (PHR) if a change was indicated;
means for indicating whether a reported current maximum output power $P_{CMAX,c}$ is affected by the P-MPR in the PHR by setting an indication in the PHR when the reported $P_{CMAX,c}$ is unaffected by the P-MPR, the indication indicating that the P-MPR has not increased or decreased by more than a downlink path loss change threshold since a last report indicating the reported $P_{CMAX,c}$ is affected by the P-MPR; and
means for transmitting the PHR to the eNodeB.

20. An apparatus for wireless communication, comprising:
means for indicating to an evolved Node B (eNodeB) whether a power management maximum power reduction (P-MPR) has changed in a power headroom report (PHR);
means for indicating to the eNodeB how a power management maximum power reduction (P-MPR) has changed in a power headroom report (PHR) if a change was indicated;
means for indicating whether a reported current maximum output power $P_{CMAX,c}$ is affected by the P-MPR in the PHR, wherein the means for indicating whether the reported $P_{CMAX,c}$ is affected by the P-MPR sets an indication field in the PHR to a value of 01 when the reported $P_{CMAX,c}$ is unaffected by the P-MPR, and the P-MPR has increased by more than a downlink path loss change threshold since a last report indicating the reported $P_{CMAX,c}$ is affected by the P-MPR; and
means for transmitting the PHR to the eNodeB.

21. An apparatus for wireless communication, comprising:
means for indicating to an evolved Node B (eNodeB) whether a power management maximum power reduction (P-MPR) has changed in a power headroom report (PHR);
means for indicating to the eNodeB how a power management maximum power reduction (P-MPR) has changed in a power headroom report (PHR) if a change was indicated;
means for indicating whether a reported current maximum output power $P_{CMAX,c}$ is affected by the P-MPR in the PHR, wherein the means for indicating whether the reported $P_{CMAX,c}$ is affected by the P-MPR sets an indication field in the PHR to a value of 10 when the reported $P_{CMAX,c}$ is unaffected by the P-MPR, and the P-MPR has decreased by more than a downlink path loss change threshold since a last report indicating the reported $P_{CMAX,c}$ is affected by the P-MPR; and
means for transmitting the PHR to the eNodeB.

22. An apparatus for wireless communication, comprising:
means for indicating to an evolved Node B (eNodeB) whether a power management maximum power reduction (P-MPR) has changed in a power headroom report (PHR);
means for indicating to the eNodeB how a power management maximum power reduction (P-MPR) has changed in a power headroom report (PHR) if a change was indicated;
means for indicating whether a reported current maximum output power $P_{CMAX,c}$ is affected by the P-MPR in the PHR, wherein the means for indicating whether the reported $P_{CMAX,c}$ is affected by the P-MPR sets an indication field in the PHR to a value of 11 when the reported $P_{CMAX,c}$ is affected by the P-MPR; and
means for transmitting the PHR to the eNodeB.

23. The apparatus of claim 19, wherein the PHR comprises an extended power headroom medium access control (MAC) control element and the indication is included in the extended power headroom MAC control element.

24. An apparatus for wireless communication, comprising:
means for receiving a request from an evolved Node B to report a power management maximum power reduction (P-MPR) value; and
means for transmitting a power headroom report (PHR) including information related to the P-MPR value, wherein the PHR includes an indication field,
wherein the indication field is set to a value of 00 when a reported current maximum output power $P_{CMAX,c}$ is unaffected by the P-MPR value, and the P-MPR value has not increased or decreased by more than a downlink path loss change threshold since a last report indicating the reported $P_{CMAX,c}$ is affected by the P-MPR value,
wherein the indication field is set to a value of 01 when the reported $P_{CMAX,c}$ is unaffected by the P-MPR value, and the P-MPR value has increased by more than a downlink path loss change threshold since a last report indicating the reported $P_{CMAX,c}$ is affected by the P-MPR value,
wherein the indication field is set to a value of 10 when the reported $P_{CMAX,c}$ is unaffected by the P-MPR value, and the P-MPR value has decreased by more than a downlink path loss change threshold since a last report indicating the reported $P_{CMAX,c}$ is affected by the P-MPR value, and
wherein the indication field is set to a value of 11 when the reported $P_{CMAX,c}$ is affected by the P-MPR value.

25. An apparatus for wireless communication, comprising:
at least one processor; and
a memory coupled to said at least one processor, wherein said at least one processor is configured to:
determine a difference between a previous power management maximum power reduction (previous P-MPR) and a current power management maximum power reduction (current P-MPR), the previous P-MPR being a power management maximum power reduction when an indication is communicated that a power backoff is applied due to the previous P-MPR;
trigger a power headroom report (PHR) when the difference is greater than a threshold and the current P-MPR is greater than a sum of a maximum power reduction (MPR) and an additional MPR (A-MPR);
indicate whether the current P-MPR has changed in the PHR;
indicate how the current P-MPR has changed in the PHR if a change was indicated; and
indicate whether a reported current maximum output power $P_{CMAX,c}$ is affected by the current P-MPR in the PHR by setting an indication in the PHR when the reported $P_{CMAX,c}$ is unaffected by the current P-MPR, the indication indicating that the current P-MPR has not increased or decreased by more than a downlink path loss change threshold since a last report indicating the reported $P_{CMAX,c}$ is affected by the current P-MPR.

26. The apparatus of claim 25, wherein the trigger replaces a trigger of the PHR that is based on a change of the current P-MPR and the previous P-MPR being greater than a threshold, the previous P-MPR being a power management maximum power reduction when a last PHR was transmitted.

27. An apparatus for wireless communication, comprising:
at least one processor; and
a memory coupled to said at least one processor, wherein said at least one processor is configured to:
determine a difference between a previous power management maximum power reduction (previous P-MPR) and a current power management maximum power reduction (current P-MPR), the previous P-MPR being a power management maximum power reduction when an indication is communicated that a power backoff is applied due to the previous P-MPR;
trigger a power headroom report (PHR) when the difference is greater than a threshold and the current P-MPR is greater than a sum of a maximum power reduction (MPR) and an additional MPR (A-MPR);
indicate whether the current P-MPR has changed in the PHR;

indicate how the current P-MPR has changed in the PHR if a change was indicated; and indicate whether a reported current maximum output power $P_{CMAX,c}$ is affected by the current P-MPR in the PHR, wherein to indicate whether the reported $P_{CMAX,c}$ is affected by the current P-MPR, the at least one processor is configured to set an indication field in the PHR to a value of 01 when the reported $P_{CMAX,c}$ is unaffected by the current P-MPR, and the current P-MPR has increased by more than a downlink path loss change threshold since a last report indicating the reported $P_{CMAX,c}$ is affected by the current P-MPR.

28. An apparatus for wireless communication, comprising:
at least one processor; and
a memory coupled to said at least one processor, wherein said at least one processor is configured to:
 determine a difference between a previous power management maximum power reduction (previous P-MPR) and a current power management maximum power reduction (current P-MPR), the previous P-MPR being a power management maximum power reduction when an indication is communicated that a power backoff is applied due to the previous P-MPR;
 trigger a power headroom report (PHR) when the difference is greater than a threshold and the current P-MPR is greater than a sum of a maximum power reduction (MPR) and an additional MPR (A-MPR);
 indicate whether the current P-MPR has changed in the PHR;
 indicate how the current P-MPR has changed in the PHR if a change was indicated; and
 indicate whether a reported current maximum output power $P_{CMAX,c}$ is affected by the current P-MPR in the PHR, wherein to indicate whether the reported $P_{CMAX,c}$ is affected by the current P-MPR, the at least one processor is configured to set an indication field to a value of 10 when the reported $P_{CMAX,c}$ is unaffected by the current P-MPR, and the current P-MPR has decreased by more than a downlink path loss change threshold since a last report indicating the reported $P_{CMAX,c}$ is affected by the current P-MPR.

29. An apparatus for wireless communication, comprising:
at least one processor; and
a memory coupled to said at least one processor, wherein said at least one processor is configured to:
 determine a difference between a previous power management maximum power reduction (previous P-MPR) and a current power management maximum power reduction (current P-MPR), the previous P-MPR being a power management maximum power reduction when an indication is communicated that a power backoff is applied due to the previous P-MPR;
 trigger a power headroom report (PHR) when the difference is greater than a threshold and the current P-MPR is greater than a sum of a maximum power reduction (MPR) and an additional MPR (A-MPR);
 indicate whether the current P-MPR has changed in the PHR;
 indicate how the current P-MPR has changed in the PHR if a change was indicated; and
 indicate whether a reported current maximum output power $P_{CMAX,c}$ is affected by the current P-MPR in the PHR, wherein to indicate whether the reported $P_{CMAX,c}$ is affected by the current P-MPR, the at least one processor is configured to set an indication field in the PHR to a value of 11 when the reported $P_{CMAX,c}$ is affected by the current P-MPR.

30. The apparatus of claim 25, wherein the PHR comprises an extended power headroom medium access control (MAC) control element and the indication is included in the extended power headroom MAC control element.

31. An apparatus for wireless communication, comprising:
at least one processor; and
a memory coupled to said at least one processor, wherein said at least one processor is configured to:
 indicate to an evolved Node B (eNodeB) whether a power management maximum power reduction (P-MPR) has changed in a power headroom report (PHR);
 indicate to the eNodeB how a power management maximum power reduction (P-MPR) has changed in a power headroom report (PHR) if a change was indicated;
 indicate whether a reported current maximum output power $P_{CMAX,c}$ is affected by the P-MPR in the PHR by setting an indication in the PHR when the reported $P_{CMAX,c}$ is unaffected by the P-MPR, the indication indicating that the P-MPR has not increased or decreased by more than a downlink path loss change threshold since a last report indicating the reported $P_{CMAX,c}$ is affected by the P-MPR; and
 transmit the PHR to the eNodeB.

32. An apparatus for wireless communication, comprising:
at least one processor; and
a memory coupled to said at least one processor, wherein said at least one processor is configured to:
 indicate to an evolved Node B (eNodeB) whether a power management maximum power reduction (P-MPR) has changed in a power headroom report (PHR);
 indicate to the eNodeB how a power management maximum power reduction (P-MPR) has changed in a power headroom report (PHR) if a change was indicated;
 indicate whether a reported current maximum output power $P_{CMAX,c}$ is affected by the P-MPR in the PHR, wherein to indicate whether the reported $P_{CMAX,c}$ is affected by the P-MPR, the at least one processor is configured to set an indication field in the PHR to a value of 01 when the reported $P_{CMAX,c}$ is unaffected by the P-MPR, and the P-MPR has increased by more than a downlink path loss change threshold since a last report indicating the reported $P_{CMAX,c}$ is affected by the P-MPR; and
 transmit the PHR to the eNodeB.

33. An apparatus for wireless communication, comprising:
at least one processor; and
a memory coupled to said at least one processor, wherein said at least one processor is configured to:
 indicate to an evolved Node B (eNodeB) whether a power management maximum power reduction (P-MPR) has changed in a power headroom report (PHR);
 indicate to the eNodeB how a power management maximum power reduction (P-MPR) has changed in a power headroom report (PHR) if a change was indicated;
 indicate whether a reported current maximum output power $P_{CMAX,c}$ is affected by the P-MPR in the PHR, wherein to indicate whether the reported $P_{CMAX,c}$ is affected by the P-MPR, the at least one processor is configured to set an indication field to a value of 10 when the reported $P_{CMAX,c}$ is unaffected by the P-MPR, and the P-MPR has decreased by more than a downlink path loss change threshold since a last report indicating the reported $P_{CMAX,c}$ is affected by the P-MPR; and
 transmit the PHR to the eNodeB.

34. An apparatus for wireless communication, comprising:
at least one processor; and
a memory coupled to said at least one processor, wherein said at least one processor is configured to:
indicate to an evolved Node B (eNodeB) whether a power management maximum power reduction (P-MPR) has changed in a power headroom report (PHR);
indicate to the eNodeB how a power management maximum power reduction (P-MPR) has changed in a power headroom report (PHR) if a change was indicated;
indicate whether a reported current maximum output power $P_{CMAX,c}$ is affected by the P-MPR in the PHR, wherein to indicate whether the reported $P_{CMAX,c}$ is affected by the P-MPR, the at least one processor is configured to set an indication field to a value of 11 when the reported $P_{CMAX,c}$ is affected by the P-MPR; and
transmit the PHR to the eNodeB.

35. The apparatus of claim 31, wherein the PHR comprises an extended power headroom medium access control (MAC) control element and the indication is included in the extended power headroom MAC control element.

36. An apparatus for wireless communication, comprising:
at least one processor; and
a memory coupled to said at least one processor, wherein said at least one processor is configured to:
receive a request from an evolved Node B to report a power management maximum power reduction (P-MPR) value; and
transmit a power headroom report (PHR) including information related to the P-MPR value,
wherein the PHR includes an indication field,
wherein the indication field is set to a value of 00 when a reported current maximum output power $P_{CMAX,c}$ is unaffected by the P-MPR value, and the P-MPR value has not increased or decreased by more than a downlink path loss change threshold since a last report indicating the reported $P_{CMAX,c}$ is affected by the P-MPR value,
wherein the indication field is set to a value of 01 when the reported $P_{CMAX,c}$ is unaffected by the P-MPR value, and the P-MPR value has increased by more than a downlink path loss change threshold since a last report indicating the reported $P_{CMAX,c}$ is affected by the P-MPR value,
wherein the indication field is set to a value of 10 when the reported $P_{CMAX,c}$ is unaffected by the P-MPR value, and the P-MPR value has decreased by more than a downlink path loss change threshold since a last report indicating the reported $P_{CMAX,c}$ is affected by the P-MPR value, and
wherein the indication field is set to a value of 11 when the reported $P_{CMAX,c}$ is affected by the P-MPR value.

37. A computer program product, comprising:
a non-transitory computer-readable medium comprising code for:
determining a difference between a previous power management maximum power reduction (previous P-MPR) and a current power management maximum power reduction (current P-MPR), the previous P-MPR being a power management maximum power reduction when an indication is communicated that a power backoff is applied due to the previous P-MPR;
triggering a power headroom report (PHR) when the difference is greater than a threshold and the current P-MPR is greater than a sum of a maximum power reduction (MPR) and an additional MPR (A-MPR);
indicating whether the current P-MPR has changed in the PHR;
indicating how the current P-MPR has changed in the PHR if a change was indicated; and
indicating whether a reported current maximum output power $P_{CMAX,c}$ is affected by the current P-MPR in the PHR by setting an indication in the PHR when the reported $P_{CMAX,c}$ is unaffected by the current P-MPR, the indication indicating that the current P-MPR has not increased or decreased by more than a downlink path loss change threshold since a last report indicating the reported $P_{CMAX,c}$ is affected by the current P-MPR.

38. A computer program product, comprising:
a non-transitory computer-readable medium comprising code for:
indicating to an evolved Node B (eNodeB) whether a power management maximum power reduction (P-MPR) has changed in a power headroom report (PHR);
indicating to the eNodeB how a power management maximum power reduction (P-MPR) has changed in a power headroom report (PHR) if a change was indicated;
indicating whether a reported current maximum output power $P_{CMAX,c}$ is affected by the current P-MPR in the PHR by setting an indication in the PHR when the reported $P_{CMAX,c}$ is unaffected by the P-MPR, the indication indicating that the P-MPR has not increased or decreased by more than a downlink path loss change threshold since a last report indicating the reported $P_{CMAX,c}$ is affected by the P-MPR; and
transmitting the PHR to the eNodeB.

39. A computer program product, comprising:
a non-transitory computer-readable medium comprising code for:
receiving a request from an evolved Node B to report a power management maximum power reduction (P-MPR) value; and
transmitting a power headroom report (PHR) including information related to the P-MPR value,
wherein the PHR includes an indication field,
wherein the indication field is set to a value of 00 when a reported current maximum output power $P_{CMAX,c}$ is unaffected by the P-MPR value, and the P-MPR value has not increased or decreased by more than a downlink path loss change threshold since a last report indicating the reported $P_{CMAX,c}$ is affected by the P-MPR value,
wherein the indication field is set to a value of 01 when the reported $P_{CMAX,c}$ is unaffected by the P-MPR value, and the P-MPR value has increased by more than a downlink path loss change threshold since a last report indicating the reported $P_{CMAX,c}$ is affected by the P-MPR value,
wherein the indication field is set to a value of 10 when the reported $P_{CMAX,c}$ is unaffected by the P-MPR value, and the P-MPR value has decreased by more than a downlink path loss change threshold since a last report indicating the reported $P_{CMAX,c}$ is affected by the P-MPR value, and
wherein the indication field is set to a value of 11 when the reported $P_{CMAX,c}$ is affected by the P-MPR value.

40. The method of claim 1, wherein the indication is a field which is set to a value of 00.

41. The method of claim 7, wherein the indication is a field which is set to a value of 00.

42. The apparatus of claim 13, wherein the indication is a field which is set to a value of 00.

43. The apparatus of claim 19, wherein the indication is a field which is set to a value of 00.

44. The apparatus of claim 25, wherein the indication is a field which is set to a value of 00.

45. The apparatus of claim 31, wherein the indication is a field which is set to a value of 00.

46. The computer program product of claim 37, wherein the indication is a field which is set to a value of 00.

47. The computer program product of claim 38, wherein the indication is a field which is set to a value of 00.

* * * * *